(12) United States Patent
Takechi et al.

(10) Patent No.: US 6,387,254 B1
(45) Date of Patent: May 14, 2002

(54) APPARATUS FOR WASTEWATER TREATMENT

(75) Inventors: Tatsuo Takechi, Yokohama; Masahisa Tanabe, Sagamihara; Toshiaki Tsubone, Tokyo; Jun Miyata, Yokohama; Kei Baba; Satoru Udagawa, both of Yokohama; Shinichi Endo, Hachioji, all of (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 09/383,314

(22) Filed: Aug. 25, 1999

(30) Foreign Application Priority Data

| Sep. 3, 1998 | (JP) | 10-249319 |
| Sep. 3, 1998 | (JP) | 10-249320 |
| Oct. 15, 1998 | (JP) | 10-293786 |
| Oct. 23, 1998 | (JP) | 10-302235 |

(51) Int. Cl.$^7$ ................................. C02F 9/00
(52) U.S. Cl. ................ 210/195.1; 210/195.3; 210/196
(58) Field of Search ............... 210/605, 620–623, 210/195.1, 195.3, 196

(56) References Cited

U.S. PATENT DOCUMENTS

| 4,056,465 A | 11/1977 | Spector |
| 4,867,883 A | 9/1989 | Daigger et al. |
| 5,811,009 A | * 9/1998 | Kos |
| 5,833,856 A | * 11/1998 | Liu et al. |
| 6,054,044 A | * 4/2000 | Hoffland et al. |

FOREIGN PATENT DOCUMENTS

| DE | 33 10572 | 9/1984 |
| JP | 10-323688 A | 12/1988 |
| JP | 10-323687 A | 12/1998 |

OTHER PUBLICATIONS

*Patent Abstracts of Japan*, vol. 011, No. 043 (C–402), Feb. 7, 1987, of JP 61–209093, (Nippon Suiko KK), Sep. 17, 1986.

*Patent Abstracts of Japan*, vol. 1999, No. 03, Mar. 31, 1999, of JP 10–323688, (NKK Corp.), Dec. 8, 1998.

* cited by examiner

*Primary Examiner*—Chester T. Barry
(74) *Attorney, Agent, or Firm*—Frishauf, Holtz, Goodman, Langer & Chick, P.C.

(57) ABSTRACT

Phosphorus in wastewater is removed by using an apparatus including a settling tank, an anaerobic tank, an aerobic tank, and a final settling tank. Nitrogen in wastewater is removed by using an apparatus including a settling tank, an anaerobic tank, a nitrification tank, and a final settling tank.

15 Claims, 10 Drawing Sheets

APPARATUS FOR WASTEWATER TREATMENT

BACKGROUND OF THE INVENTION

1. Field of the Invention

The present invention relates to methods for treating wastewater and apparatuses therefor, and more particularly, to methods for removing phosphorus and nitrogen from wastewater and apparatuses therefor.

2. Description of the Related Art

The activated sludge process is a typical treatment process for removing organic substances from wastewater, and an anaerobic-aerobic activated sludge process is used as a conventional method for simultaneously removing phosphorus anions and organic substances from wastewater.

An example of a wastewater treatment apparatus by the anaerobic-aerobic activated sludge process is shown in FIG. 6. This wastewater treatment apparatus includes a primary settling tank 2, an anaerobic tank 3 in which activated sludge releases phosphoric acid ion from cells into wastewater by a biological phosphorus-releasing reaction, an aerobic tank 4 in which activated sludge takes up phosphoric acid ion into cells by a biological phosphorus-uptake reaction, and a final settling tank 6. The amount of phosphorus taken up at the aerobic stage is greater than the amount of phosphorus released at the anaerobic stage, and a difference between these amounts corresponds to the amount of phosphorus removed.

In the primary settling tank 2, relatively large and heavy solids contained in wastewater 1 are removed. After being subjected to the biological phosphorus-releasing reaction at the anaerobic stage and the biological phosphorus-uptake reaction at the aerobic stage, phosphorus in the wastewater is transformed into a constituent of the sludge, and is finally discharged as excess sludge from the wastewater treatment apparatus. Meanwhile, organic substances in the wastewater are removed both at the anaerobic stage and at the aerobic stage.

The phosphorus removal from wastewater using a wastewater treatment apparatus by means of the anaerobic-aerobic activated sludge process has the following drawbacks. That is, when the organic substance concentration in the wastewater is decreased, for example, by the influx of rainwater, since the wastewater is diluted while being supplied with oxygen, the organic substances in the wastewater, which have been oxidized and diluted, are fed to the anaerobic stage. As a result, since the organic substance concentration is decreased in comparison with the phosphoric acid ion concentration, the rate of the phosphorus-releasing reaction at the anaerobic stage and the rate of the phosphorus-uptake reaction at the aerobic stage are decreased, resulting in deterioration in the quality of treated water.

Since solid waste components of the wastewater are subjected to sedimentation in the primary settling tank, the wastewater supplied to the anaerobic tank from the primary settling tank containing mainly soluble pollutants. Therefore, when the ratio of the organic substance concentration to the phosphoric acid ion concentration is low with respect to the soluble pollutants in the wastewater to be fed to the anaerobic stage, the rate of the phosphorus-releasing reaction at the anaerobic stage and the rate of the phosphorus-uptake reaction at the aerobic stage are also decreased, resulting in deterioration in the quality of treated water.

In order to cope with such problems, a method may be employed in which an organic chemical agent such as methanol, together with the wastewater, is supplied to the anaerobic stage, and thus, by compensating for the shortage of the organic substance concentration in the wastewater, decreases in the rate of the phosphorus-releasing reaction at the anaerobic stage and the rate of the phosphorus-uptake reaction at the aerobic stage are prevented.

In the conventional method of adding an organic chemical agent to the anaerobic stage, although in general, relatively inexpensive methanol is used, the cost for the chemical agent still increases operating expenses. Moreover, since methanol is a Class IV hazardous substance, safety must be taken into consideration in handling and storage facilities, and facilities for receipt and supply must be prepared, resulting in an increased cost of equipment and difficulty in handling.

With respect to both the phosphorus-releasing reaction at the anaerobic stage and the phosphorus-uptake reaction at the aerobic stage, substantially large amounts of organic substances are required. In the phosphorus removal treatment by the anaerobic-aerobic activated sludge process, if there is a shortage of organic substances, satisfactory phosphorus removal cannot be achieved. Therefore, it is effective for improving the results of phosphorus removal treatment to introduce the organic substances contained in the wastewater fed into the primary settling tank and removed in the primary settling tank, that is, organic substances mainly composed of solids, to the anaerobic stage or both the anaerobic stage and the aerobic stage.

As a conventional method of operating facilities having such an effect, there is a method in which by decreasing the number of primary settling tanks used in wastewater treatment facilities having a plurality of treatment lines, operation is performed at increased water surface loading with respect to the primary settling tanks so that suspended solid (SS) concentration in the primary settling tank effluent is increased, and thus organic substances flowing into the anaerobic stage are increased.

However, it is difficult to accurately control the amount of solid organic substances that flow into the anaerobic stage by changing the number of primary settling tanks in operation.

In order to solve the problems described above, the inventor has already applied for patents which disclose techniques for satisfactory phosphorus removal treatment by increasing an amount of organic substances to be supplied to anaerobic tanks. One such method for removing phosphorus from wastewater, in which at least a portion of sediment in a primary settling tank is fed to an anaerobic tank, and a method for removing phosphorus from wastewater, in which the sediment is subjected to ultrasonic treatment before being fed to the anaerobic tank, are disclosed in Japanese Patent Application No. 9-133989. Another such method for removing phosphorus from wastewater, in which the sediment is subjected to ozone treatment before being fed to the anaerobic tank, is disclosed in Japanese Patent Application No. 9-133988. However, when the sediment in the primary settling tank is introduced to the anaerobic tank as it is, since particles of solids contained in the sedimented sludge are relatively large and have a small surface area per unit weight, the rate of decomposition/treatment in a biological reactor such as an anaerobic tank is relatively low. When the sediment in the primary settling tank is fed to the anaerobic tank after ultrasonic treatment, solids, as the sediment, contain microorganisms enclosed by cell walls and/or cell membranes, and cellulose, which are relatively rigid and are not easily broken by vibration treatment. Therefore, the particle size of the solids introduced to the anaerobic tank is not sufficiently reduced. Furthermore, when the sediment in the primary settling tank is fed to the anaerobic tank after ozone treatment, a portion of organic substances contained in the sediment is oxidized and mineralized, and thus loses effectiveness as organic substances. Since a relatively large amount of electric power, approximately 10 to 15 kWh/kg $O_3$, is also consumed for the generation of ozone, operating expenses increase.

As a conventional method for simultaneously removing nitrogen compounds and organic substances, a biological nitrification-denitrification process is used.

An example of a wastewater treatment apparatus by the biological nitrification-denitrification process is shown in FIG. 14. This wastewater treatment apparatus includes a primary settling tank 2, a nitrification tank 4 for oxidizing (nitrifying) nitrogen compounds contained in wastewater to nitrate nitrogen or to nitrite nitrogen, a denitrification tank 3 for reducing (denitrifying) nitrate nitrogen or nitrite nitrogen to nitrogen gas, and a final settling tank 7. After relatively large and heavy solids are removed from wastewater 1 in the primary settling tank 2, nitrification and denitrification are performed, and nitrogen is released into the atmosphere as nitrogen gas, and thus nitrogen is removed from wastewater. Meanwhile, organic substances in the wastewater are removed both at the denitrification stage and at the nitrification stage.

The nitrogen removal from wastewater using a wastewater treatment apparatus by the biological nitrification-denitrification process has the following drawbacks. That is, when the organic substance concentration in the wastewater is decreased, for example, by the influx of rainwater, since the wastewater is diluted while being supplied with oxygen, the organic substances in the wastewater, which have been oxidized and diluted, are fed to the denitrification stage. As a result, since the organic substance concentration is further decreased in comparison with the nitrogen concentration, the rate of denitrification reaction at the denitrification stage is decreased, resulting in deterioration in the quality of treated water.

Since solid particles are subjected to sedimentation in the primary settling tank, the wastewater fed to the denitrification stage through the primary settling tank is mainly composed of soluble pollutants. Therefore, when the ratio of the organic substance concentration to the nitrogen concentration is low with respect to the soluble wastes in the wastewater to be fed to the denitrification stage, the rate of nitrogen removal reaction at the denitrification stage is also decreased, resulting in deterioration in the quality of treated water.

In order to cope with such problems, a method is used, in which an organic chemical agent such as methanol, together with the wastewater, is fed to the denitrification stage, and thus, by compensating for the shortage of the organic substance concentration in the wastewater, a decrease in the rate of denitrification reaction is prevented.

In the conventional method of adding an organic chemical agent to the denitrification stage, although in general methanol, which is relatively inexpensive, is used, the cost for the chemical agent still increases operating expenses. Moreover, since methanol is a Class IV hazardous substance, safety must be taken into consideration in handling, and storage facilities and facilities for receipt and supply must be prepared, resulting in increased cost of equipment and difficulty in handling.

When the ratio of the organic substance concentration to the nitrogen concentration is low with respect to the wastewater supplied to the denitrification stage, it is difficult to cause satisfactory nitrogen removal reactions, in particular, denitrification reactions, because of a shortage of organic substances, and thus satisfactory nitrogen removal cannot be achieved. Therefore, it is effective in improving the results of nitrogen removal treatment to introduce the organic substances contained in the wastewater fed into the primary settling tank and removed in the primary settling tank, that is, organic substances mainly composed of solids, to the denitrification stage.

As a conventional method for operating facilities for producing such effects, there is a method in which, by decreasing the number of primary settling tanks used in wastewater treatment facilities having a plurality of treatment lines, operation is performed at increased water surface loading with respect to the primary settling tanks so that suspended solids (SS) concentration in the primary settling tank effluent is increased, and thus the amount of organic substances flowing into the denitrification stage is increased.

However, it is difficult to accurately control the amount of solid organic substances that flow into the denitrification stage by changing the number of primary settling tanks in operation.

In order to solve the problems described above, the inventor has already applied for patents which disclose techniques for satisfactory nitrogen removal treatment by increasing the amounts of organic substances to be supplied to denitrification tanks or anaerobic tanks. One such method for removing nitrogen from wastewater, in which at least a portion of sediment in a primary settling tank is fed to a denitrification tank or an anaerobic tank, and a method for removing nitrogen from wastewater, in which the sediment is subjected to ultrasonic treatment before being fed to the denitrification tank or the anaerobic tank, are disclosed in Japanese Patent Application No. 9-133989. Another such method for removing nitrogen from wastewater, in which the sediment is subjected to ozone treatment before being fed to the denitrification tank or the anaerobic tank, is disclosed in Japanese Patent Application No. 9-133988. However, when the sediment in the primary settling tank is introduced to the denitrification tank or the anaerobic tank as it is, since particles of solids contained in the sedimented sludge are relatively large and have a small surface area per unit weight, the rate of decomposition/treatment in a biological reactor, such as a denitrification tank or an anaerobic tank, is relatively low. When the sediment in the primary settling tank is fed to the denitrification tank or the anaerobic tank after ultrasonic treatment, solids, as the sediment, contain microorganisms enclosed by cell walls and/or cell membranes, and cellulose, which are relatively rigid and are not easily broken by vibration treatment. Therefore, the particle size of the solids introduced to the denitrification tank or the anaerobic tank is not sufficiently reduced. Furthermore, when the sediment in the primary settling tank is fed to the denitrification tank or the anaerobic tank after ozone treatment, a portion of organic substances contained in the sediment is oxidized and mineralized, and thus loses effectiveness as organic substances. Since a relatively large amount of electric power, approximately 10 to 15 kWh/kg $O_3$, is also consumed for the generation of ozone, operating expenses increase.

SUMMARY OF THE INVENTION

It is an object of the present invention to provide methods for treating wastewater and apparatuses therefor, in which effective wastewater treatment can be performed in an economical manner.

According to a first aspect of the present invention, a method for treating wastewater includes the steps of: removing phosphorus from wastewater, using a wastewater treatment apparatus including a settling tank, an anaerobic tank, and an aerobic tank; crushing at least a portion of sediment in the settling tank; and supplying the crushed sediment to the anaerobic tank.

According to a second aspect of the present invention, a wastewater treatment apparatus includes: a settling tank for removing solids contained in wastewater; an anaerobic tank, in which effluent from the settling tank is introduced and activated sludge releases phosphoric acid ion from cells into the wastewater by a biological phosphorus-releasing reaction; an aerobic tank in which effluent from the anaerobic tank is introduced and activated sludge takes up phosphoric acid ion into cells by a biological phosphorus-uptake reaction; a line for withdrawing sediment from the settling tank; a crushing device for crushing the withdrawn sediment; and a line for supplying the crushed sediment to the anaerobic tank.

According to a third aspect of the present invention, a method for treating wastewater includes the steps of: removing phosphorus from wastewater, using a wastewater treatment apparatus including a primary settling tank, an anaerobic tank, an aerobic tank, and a final settling tank; returning effluent from the aerobic tank to the primary settling tank; returning sludge withdrawn from the final settling tank to the primary settling tank; and sending sludge withdrawn from the primary settling tank to the anaerobic tank or the aerobic tank.

According to a fourth aspect of the present invention, a method for treating wastewater includes the steps of: removing phosphorus from wastewater, using a wastewater treatment apparatus including a primary settling tank, an anaerobic tank, an aerobic tank, and a final settling tank; returning effluent from the aerobic tank to the primary settling tank; and sending sludge withdrawn from the primary settling tank to the anaerobic tank or the aerobic tank.

According to a fifth aspect of the present invention, a method for treating wastewater includes the steps of: removing phosphorus from wastewater, using a wastewater treatment apparatus including a primary settling tank, an anaerobic tank, an aerobic tank, and a final settling tank; returning sludge withdrawn from the final settling tank to the primary settling tank; and sending sludge withdrawn from the primary settling tank to the anaerobic tank or the aerobic tank.

According to a sixth aspect of the present invention, a wastewater treatment apparatus includes: a primary settling tank for removing solids contained in wastewater; an anaerobic tank, in which effluent from the settling tank is introduced and activated sludge releases phosphoric acid ion from cells into the wastewater by a biological phosphorus-releasing reaction; an aerobic tank in which effluent from the anaerobic tank is introduced and activated sludge takes up phosphoric acid ion into cells by a biological phosphorus-uptake reaction; a final settling tank for settling wastewater treated in the aerobic tank; a line for returning effluent from the aerobic tank to the primary settling tank; a line for returning sludge withdrawn from the final settling tank to the primary settling tank; and a line for sending sludge withdrawn from the primary settling tank to the anaerobic tank or the aerobic tank.

According to a seventh aspect of the present invention, a wastewater treatment apparatus includes: a primary settling tank for removing solids contained in wastewater; an anaerobic tank, in which effluent from the settling tank is introduced and activated sludge releases phosphoric acid ion from cells into the wastewater by the biological phosphorus-releasing reaction; an aerobic tank in which effluent from the anaerobic tank is introduced and activated sludge takes phosphoric acid ion into cells by the biological phosphorus-uptake reaction; a final settling tank for settling wastewater treated in the aerobic tank; a line for returning effluent from the aerobic tank to the primary settling tank; and a line for sending sludge withdrawn from the primary settling tank to the anaerobic tank or the aerobic tank.

According to an eighth aspect of the present invention, a wastewater treatment apparatus includes: a primary settling tank for removing solids contained in wastewater; an anaerobic tank, in which effluent from the settling tank is introduced and activated sludge releases phosphoric acid ion from cells into the wastewater by a biological phosphorus-releasing reaction; an aerobic tank in which effluent from the anaerobic tank is introduced and activated sludge takes up phosphoric acid ion into cells by a biological phosphorus-uptake reaction; a final settling tank for settling wastewater treated in the aerobic tank; a line for returning sludge withdrawn from the final settling tank to the primary settling tank; and a line for sending sludge withdrawn from the primary settling tank to the anaerobic tank or the aerobic tank.

According to a ninth aspect of the present invention, a method for treating wastewater includes the steps of: removing nitrogen from wastewater, using a wastewater treatment apparatus including a settling tank and a denitrification tank; crushing at least a portion of sediment in the settling tank; and supplying the crushed sediment to the denitrification tank.

According to a tenth aspect of the present invention, a method for treating wastewater includes the steps of: removing nitrogen from wastewater, using a wastewater treatment apparatus including a settling tank and an anaerobic tank, and a nitrification tank; crushing at least a portion of sediment in the settling tank; and supplying the crushed sediment to the anaerobic tank.

According to an eleventh aspect of the present invention, a wastewater treatment apparatus includes: a settling tank for removing solids contained in wastewater; a denitrification tank, in which effluent from the settling tank is introduced and nitrate nitrogen or nitrite nitrogen in wastewater is reduced to nitrogen gas; a line for withdrawing sediment in the settling tank; a crushing device for crushing the withdrawn sediment; and a line for supplying the crushed sediment to the denitrification tank.

According to a twelfth aspect of the present invention, a wastewater treatment apparatus includes: a settling tank for removing solids contained in wastewater; an anaerobic tank, in which effluent from the settling tank is introduced, nitrate nitrogen or nitrite nitrogen in the wastewater is reduced to nitrogen gas, and activated sludge releases phosphoric acid ion from cells into the wastewater by a biological phosphorus-releasing reaction; a line for withdrawing sediment from the settling tank; a crushing device for crushing the withdrawn sediment; and a line for supplying the crushed sediment to a denitrification tank.

According to a thirteenth aspect of the present invention, a wastewater treatment apparatus includes: a primary settling tank for removing solids contained in wastewater; a denitrification tank, in which effluent from the primary settling tank is introduced, and nitrate nitrogen or nitrite nitrogen in the wastewater is reduced to nitrogen gas; a nitrification tank, in which effluent from the denitrification tank is introduced, and nitrogen compounds in the wastewater are oxidized to nitrate nitrogen or nitrite nitrogen; a final settling tank for settling effluent from the nitrification tank; and a line for returning a portion of effluent from the nitrification tank or a portion of effluent from the final settling tank to the primary settling tank.

DESCRIPTION OF THE PREFERRED EMBODIMENT

EMBODIMENT 1

In embodiment 1, the deterioration of phosphorus removal performance in an anaerobic-aerobic activated sludge process due to low organic substance concentration in wastewater, in particular, a shortage of the soluble organic substance concentration, is overcome. In accordance with embodiment 1, methods and apparatuses for effectively and economically removing phosphorus are provided, in which sludge containing solid organic substances generated in a primary settling tank are supplied to an anaerobic tank, and thus by compensating for the shortage of the organic substance concentration of the wastewater flowing into the anaerobic tank, organic substances generated in the waste treatment facilities are effectively used and the deterioration of phosphorus removal performance is avoided.

Embodiment 1 relates to methods for removing phosphorus from wastewater and apparatuses therefor, in which phosphorus in wastewater is removed using an apparatus including at least a settling tank for wastewater to be treated, an anaerobic tank, and an aerobic tank, and at least a portion of the sediment from the wastewater in the settling tank is crushed or ground before being supplied to the anaerobic tank.

In accordance with the method for biologically removing phosphorus from wastewater and the apparatus therefor in embodiment 1, at least a portion of the sediment in the primary settling tank, which contains abundant solid organic substances, that is, at least a portion of the solid organic substances, is fed into the anaerobic tank in order to secure an organic substance concentration required for the phosphorus-releasing reaction at the anaerobic stage. By crushing or grinding at least a portion of the sediment in the primary settling tank, solid organic substances contained in the sediment in the primary settling tank are particulated or solubilized so that microorganisms can effectively and promptly use the solid organic substances for the phosphorus-releasing reaction. The present inventors have found through experimentation that when the organic substance concentration in wastewater is low and the organic substance concentration required for the phosphorus-releasing reaction at the anaerobic stage is insufficient, the oxidation-reduction potential (ORP) at the anaerobic stage is −100 mV or more. Accordingly, an ORP at the anaerobic stage is measured, and only when the ORP is −100 mV or more, that is, only when the organic substance concentration required for the phosphorus-releasing reaction is insufficient at the anaerobic stage, sediment from the primary settling tank which has been crushed or ground is fed into the anaerobic tank. Thus, by supplying organic substances originating from the solids, the organic substance concentration required for the phosphorus-releasing reaction will be sufficient.

Figure 1:
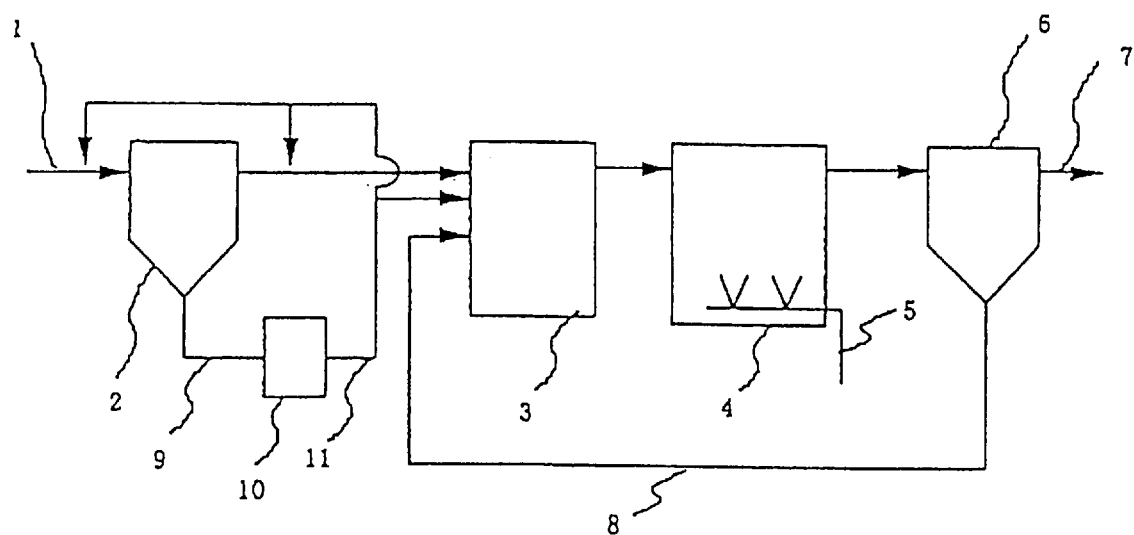
FIG. 1 is a block diagram of a biological phosphorus removal apparatus in accordance with embodiment 1.

An example of a biological phosphorus removal apparatus based on embodiment 1 is shown in FIG. 1.

The biological phosphorus removal apparatus based on embodiment 1 mainly includes a primary settling tank 2, an anaerobic tank 3, an aerobic tank 4, and a final settling tank 6. In the anaerobic tank 3, only agitation is performed, and in the aerobic tank 4, oxygen is supplied by an air diffuser 5 and agitation is performed by flow caused by the air diffusion.

In the biological phosphorus removal apparatus shown in FIG. 1, wastewater 1 is subjected to the solid-liquid separation in the primary settling tank 2, and is then passed to the anaerobic tank 3 and to the aerobic tank 4 in that order. Effluent from the aerobic tank 4 flowing into the final settling tank 6 is separated into treated water 7 and activated sludge in the final settling tank 6. At least a portion of the activated sludge separated and thickened in the final settling tank 6 is sent to the anaerobic tank 3 as return sludge 8.

Sediment 9 settled in the primary settling tank is subjected to crushing or grinding treatment by a crushing device or a grinding device 10, and is then directly sent to the anaerobic tank 3 as crushed or ground sediment 11 from the primary settling tank, or is sent to the anaerobic tank 3 through the effluent channel of the primary settling tank 2. Alternatively, the crushed or ground sediment 11 is fed to the primary settling tank 2 through the influx channel of the primary settling tank 2, and a portion, excluding those which are settled again in the primary settling tank 2, is sent to the anaerobic tank 3 through the effluent channel of the primary settling tank 2.

In the anaerobic tank 3, by using organic substances mainly constituting soluble components in the wastewater 1 and organic substances originating from the sediment 9 in the primary settling tank, activated sludge releases phosphoric acid ion accumulated in cells in the activated sludge into the wastewater (the phosphorus-releasing reaction). In the aerobic tank 4, activated sludge takes up phosphoric acid ion in the wastewater into cells in the activated sludge (the phosphorus-uptake reaction), and simultaneously, organic substances are removed by oxidizing decomposition.

After solid organic substances contained in the sediment 9 are treated by the crushing device or the grinding device 10, at least a portion thereof is finely particulated and at least a portion thereof becomes soluble components. That is, when the grain sizes of the solids are reduced by crushing or grinding treatment, the surface area increases with respect to solids having the same weight. Microorganisms, animals, plants, and the like are contained in the sediment 9, and these organisms are composed of cells enclosed by cell membranes and/or cell walls. When these membranous structures are broken by crushing or grinding treatment, since cell fluids are released from the cells, the soluble organic substance concentration of the wastewater into which the crushed or ground sediment 11 is fed is increased.

In general, when microorganisms propagate by decomposing and using organic substances, organic substances having higher molecular weights take longer time to be decomposed and become useful. Organic substances having lower molecular weights are easier to be used, and the rate of the decomposing reaction is higher. In comparison with soluble organic substances, solid organic substances generally have larger molecular weights, and thus the solid organic substances are more difficult to be used by microorganisms. This is because of the fact that when microorganisms take up organic substances through cell membranes and/or cell walls, the organic substances must have enough low molecular weights. In order for microorganisms to use organic substances having high molecular weights, the organic substances having high molecular weights must be decomposed into organic substances having lower molecular weights, thus requiring time for decomposition to usable states. In organisms, reactions for decomposing organic substances having high molecular weights into organic substances having lower molecular weights are mainly performed by the enzymatic reactions. In such reactions, as the surface on which an enzyme acts is increased, that is, as the grain sizes of solid organic substances having comparable weights are decreased, the reaction rate increases. Consequently, in embodiment 1, by subjecting the sediment 9 to crushing or grinding treatment so that the grain sizes of solids are reduced, enzymatic reactions which allow microorganisms to decompose and use solid organic substances are enhanced, the rate of decomposition and use of solid organic substances is increased, and the microbial reactions may be efficiently completed in a reactor of limited capacity. When the soluble organic substances generated by crushing or grinding the sediment 9 are introduced to the anaerobic tank 3, they are also effectively and promptly used for the phosphorus-releasing reaction and the denitrification reaction in the anaerobic tank 3 and for the subsequent phosphorus-uptake reaction in the aerobic tank 4. This happens at least in the treatment of municipal wastewater. Sediments 9 for a municipal wastewater treatment include microbial bodies or plant cells or animal cells, which are enveloped by cell walls, or cell membrane and cell fluids including organic components leak out by breaking the cell structure. In this respect also, the crushing or grinding treatment to the sediment 9 contributes to increase in the rate of decomposition and use of the organic substances contained in solids in the influent wastewater 1 by microorganisms in the reaction tank, and this is effective to complete the microbial reaction in a reactor of limited capacity.

The crushed or ground sediment 11 may be directly fed into the anaerobic tank 3, or may be fed into the effluent channel of the primary settling tank 2 at any point from the weir to the anaerobic tank 3. When such a method is used, all the crushed or ground sediment 11 can be fed into the anaerobic tank 3. Since the capacity of the channel from the supply point of the crushed or ground sediment 11 to the anaerobic tank 3 is relatively small and the residence time is relatively short, by changing the feed amount of the crushed or ground sediment 11, the reaction in the anaerobic tank 3 may be controlled over relatively short periods of time. Whether the crushed or ground sediment 11 is directly fed into the anaerobic tank 3 or is fed into the effluent channel of the primary settling tank 2 at any point from the weir to the anaerobic tank 3 can be determined depending on the distance between the installation position of the crushing device or grinding device 10 and the supplying position of the crushed or ground sediment 11, waterhead difference, or the like.

The crushed or ground sediment 11 may be fed into the influx channel of the primary settling tank 2 at any point, and after removing the solids settled again in the primary settling tank 2, components of the crushed or ground sediment 11 which are not settled may be fed into the anaerobic tank 3 together with the overflow from the primary settling tank 2. In such a method, although all of the crushed or ground sediment 11 is not fed into the anaerobic tank 3, since the capacity of the channel from the supply point of the crushed or ground sediment 11 to the anaerobic tank 3 is large and the residence time is increased, the components, excluding solids which readily settle out, originating from the crushed or ground sediment 11 can be fed into the anaerobic tank 3 at relatively stable concentrations.

Depending on conditions, such as the phosphorus concentration in the effluent from the primary settling tank 2 after sedimentation and the residence time in the anaerobic tank 3 and the aerobic tank 4, the phosphorus-uptake reaction must be accelerated in comparison with the phosphorus-releasing reaction. In such a case, the crushed or ground sediment 11 may be introduced to the aerobic tank 4 in addition to the anaerobic tank 3.

The withdrawal of the sediment 9 from the primary settling tank 2 is performed by opening an outlet provided on the lower section or the bottom of the primary settling tank 2. The sediment 9 may be naturally discharged in accordance with the position of the primary settling tank 2 or a pump may be used.

The sediment treated by the crushing device or grinding device is in the form of a suspension or a slurry, and has a concentration of approximately 3,000 to 12,000 mg/l, and normally approximately 5,000 to 10,000 mg/l.

The timing of adding the crushed or ground sediment is determined, for example, by measuring the oxidation-reduction potential (ORP) of the anaerobic tank, and when the ORP is −100 mV or more, the addition is performed. When the ratio of the organic substance concentration to the phosphoric acid ion concentration in the soluble components of wastewater 1 is always rather low, it is therefore practical to continuously add the crushed or ground sediment during operation.

The pump used for withdrawing the sediment 9 from the primary settling tank is generally a slurry pump which does not easily clog, and thus the pump is not very effective for crushing or grinding the sediment. Therefore, in order to crush or grind the sediment, a crushing device or a grinding device must be provided. The crushing device or the grinding device 10 may be of various types, such as a gear type and a multiple spindle disk type. In order to control the degree of crushing or grinding, it is effective to appropriately select the mesh of a screen in which the crushed or ground sediment is to be passed. If the screen mesh is too small, clogging easily occurs, and if it is too large, solids having a large grain size easily pass therethrough, and thus the screen mesh size is preferably chosen to be approximately 1 to 5 mm. Although the crushing device or the grinding device 10 may be installed in-line or in an open channel, since the sediment 9 may be a source of unpleasant odors, the in-line installation is preferred. Since a general-purpose device can be used as such a crushing device or grinding device 10, the cost of equipment as well as the operating expenses, which mainly cover the cost of powering motors, will be relatively low, and the grain size reduction effect with respect to solids will be relatively large.

The amount of the crushed or ground sediment added is, preferably, approximately 0.1 to 1.5% on the volume of the wastewater 1, and normally approximately 0.5 to 1.0%. The addition may be continuously or intermittently performed.

The addition is preferably terminated when the ORP reaches approximately −150 to −250 mV, and depending on the result, continuous addition may be effective.

Figure 2:
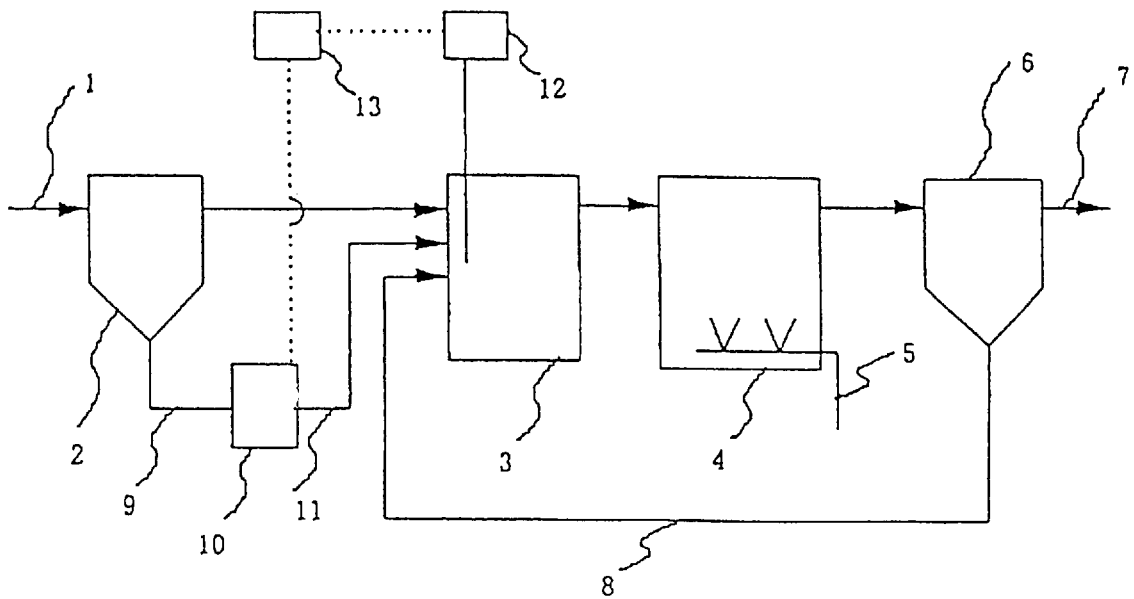
FIG. 2 is a block diagram of another biological phosphorus removal apparatus in accordance with embodiment 1.

FIG. 2 shows another example of a biological phosphorus removal apparatus in accordance with embodiment 1. With respect to the biological phosphorus removal apparatus based on the conventional technique shown in FIG. 6, in accordance with the results of the inventors' experimentation, when the soluble organic substance concentration in the wastewater 1 is high and the organic substance concentration required for the phosphorus-releasing reaction in the anaerobic tank 3 is obtained, the ORP in the anaerobic tank 3 is −100 mV or less, and when the organic substance concentration in the wastewater 1 is low and the organic substance concentration required for the phosphorus-releasing reaction in the anaerobic tank 3 is not satisfactory, the ORP in the anaerobic tank 3 is −100 mV or more.

Based on the above, in the biological phosphorus removal apparatus in accordance with embodiment 1, shown in FIG. 2, the operation of the apparatus is controlled so that when the measured value by an ORP meter 12 mounted on an anaerobic tank 3 is approximately −150 to −250 mV or less, the influent of crushed or ground sediment 11 from a primary settling tank is halted or the operation of a crushing device or a grinding device 10 is halted, and when the measured value is −100 mV or more, the influx of the crushed or ground sediment 11 is started. These controls are performed by a control device 13.

The phosphorus removal method in the present invention is also applicable to a wastewater treatment apparatus including an anaerobic stage, a denitrification stage (an anoxic stage), and a nitrification stage (an aerobic stage), in addition to the wastewater treatment apparatus including the anaerobic stage and the aerobic stage.

Figure 3:
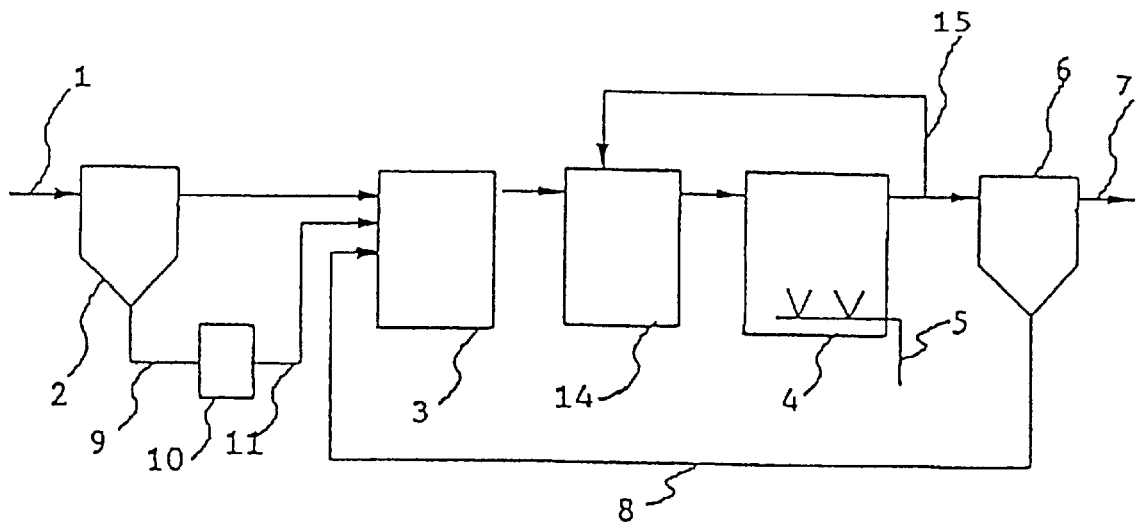
FIG. 3 is a block diagram of another biological phosphorus removal apparatus in accordance with embodiment 1.

FIG. 3 shows another example of a biological phosphorus removal apparatus in accordance with embodiment 1. In the biological phosphorus removal apparatus in accordance with embodiment 1 shown in FIG. 3, a denitrification tank 14 is added to the biological phosphorus removal apparatus in accordance with embodiment 1 shown in FIG. 1. The apparatus shown in FIG. 3 mainly includes a primary settling tank 2, an anaerobic tank 3, the denitrification tank 14, an aerobic tank 4, and a final settling tank 6.

In the biological phosphorus removal apparatus shown in FIG. 3, in the denitrification tank 14, only agitation is performed, and effluent from the anaerobic tank 3 and a nitrification circulating liquid 15 are fed into the denitrification tank 14. In the denitrification tank 14, nitrate nitrogen or nitrite nitrogen contained in the nitrification circulating liquid 15 is reduced to nitrogen gas (a denitrification reaction), using organic substances in the wastewater, and thus denitrification treatment is performed.

Additionally, in the biological phosphorus removal apparatus shown in FIG. 3, a portion of crushed or ground sediment 11 from the primary settling tank may be fed into the denitrification tank 14.

EXAMPLE OF THE INVENTION

Figure 4:
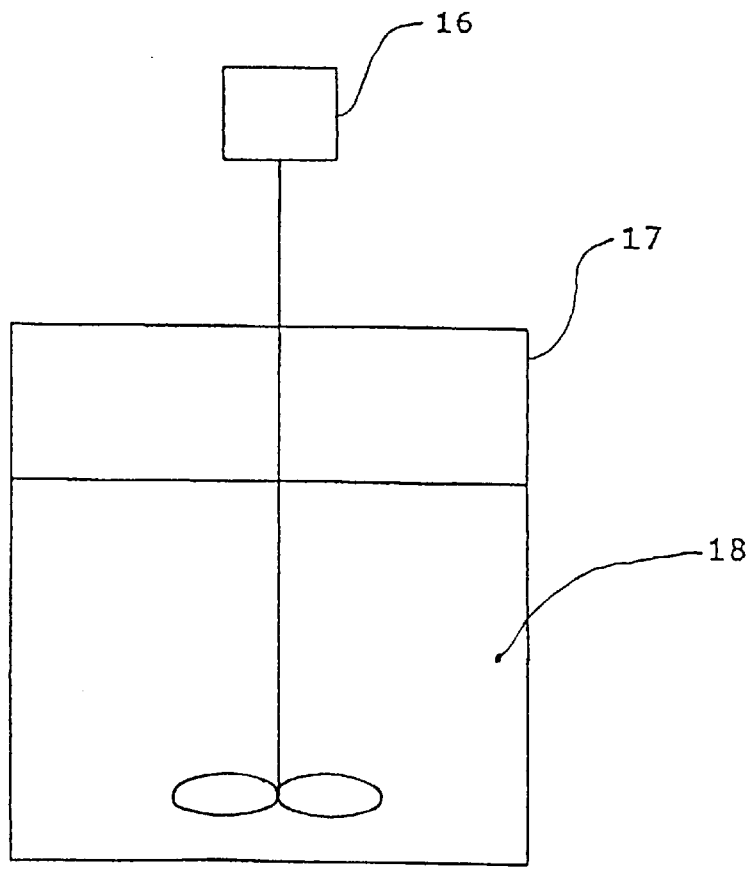
FIG. 4 is a side view of an experimental device for the phosphorus-releasing reaction in accordance with embodiment 1.
Figure 6:
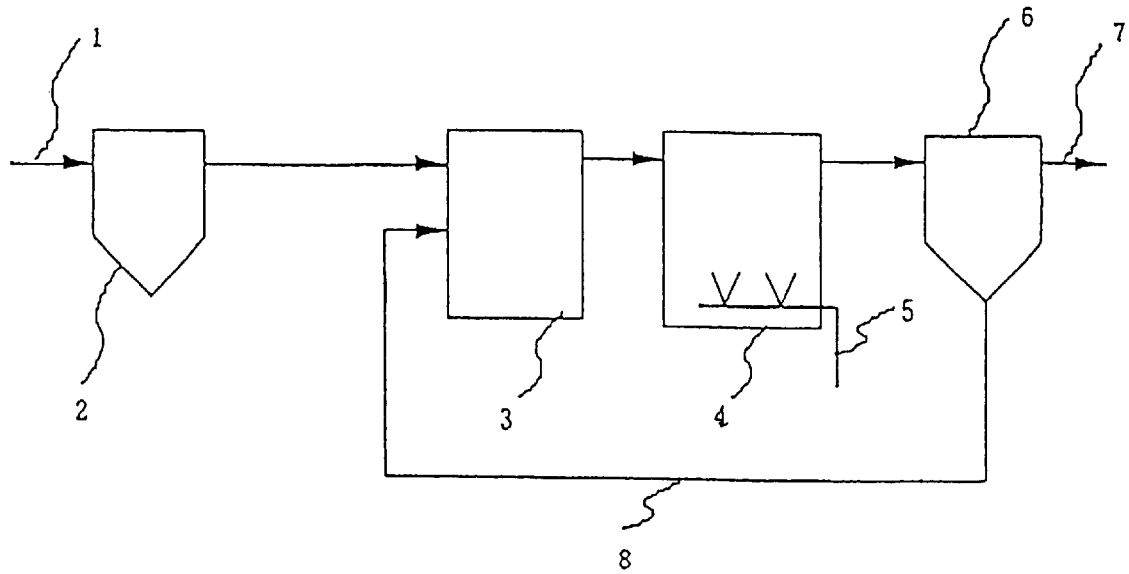
FIG. 6 is a block diagram of a conventional biological phosphorus removal apparatus.

An example of the biological phosphorus removal method in accordance with embodiment 1 will be described below. FIG. 4 shows an experimental device. In the example, a mixture of return sludge, wastewater, and primary settling tank sediment taken from a wastewater treatment apparatus having a flow pattern as shown in FIG. 6 as a sample was fed into the device shown in FIG. 4, and characteristics of the phosphorus-releasing reaction of activated sludge under anaerobic conditions were measured. Table 1 shows the composition of samples. The wastewater taken from the wastewater treatment apparatus having a flow shown in FIG. 6 had a BOD concentration of 42 mg/L, and the return sludge had an MLSS concentration of 4,200 mg/L. In order to determine if the wastewater treatment apparatus having a flow shown in FIG. 1 functioned effectively, the primary settling tank sediment having an MLSS concentration of 3,200 mg/L taken from the primary settling tank in the wastewater treatment apparatus having a flow shown in FIG. 6 was ground for 3 minutes by a Potter-type glass homogenizer having a capacity of 10 ml, and its effectiveness as an organic substance source was investigated.

TABLE 1

| Sample and Volume | Sample A | Sample B |
|---|---|---|
| Return sludge (ml) | 1,000 | 1,000 |
| Wastewater (ml) | 2,000 | 2,000 |
| Ground sediment from primary settling tank (ml) | 20 | 0 |

Figure 5:
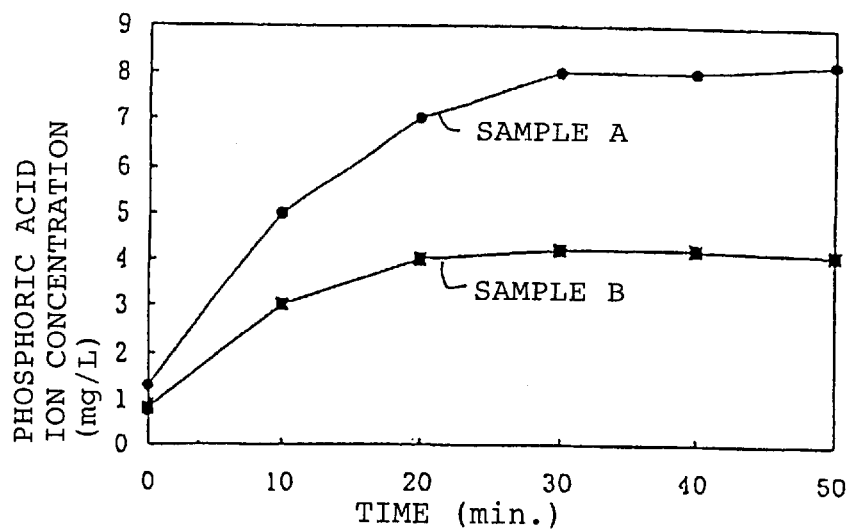
FIG. 5 a graph which shows a change in the phosphoric acid ion concentration over time in cases when ground sediment from the primary settling tank is added and when it is not added, using the device shown in FIG. 4.

FIG. 5 shows a change in the phosphoric acid ion concentration in the sample wastewater over time. A sample A in which the phosphorus-releasing reaction was performed with the ground primary settling tank sediment being added was compared with a sample B in which the phosphorus-releasing reaction was performed without the ground primary settling tank sediment. The rate of increase of phosphoric acid ion in the wastewater was higher when the phosphorus-releasing reaction was performed with the ground sediment being added. That is, it has been confirmed that by adding the primary settling tank sediment, which had been subjected to grinding treatment in order to reduce the grain size of solids and to solubilize a portion of organic substances, to the sample wastewater, the rate of the phosphorus-releasing reaction was increased.

Since crushing treatment is similar to grinding treatment, the crushing treatment is also considered to be effective in reducing the grain size of solids in the primary settling tank sediment and in solubilizing a portion of the organic substances.

In embodiment 1, the primary settling tank sediment which has been crushed or ground is fed into an anaerobic stage, and in some cases, to an anaerobic stage of a biological phosphorus removal apparatus having an anoxic stage and an aerobic stage, so that the organic substance concentration required for the phosphorus-releasing reaction at the anaerobic stage is secured.

Accordingly, either when the quality of treated water is deteriorated by the decreased rate of phosphorus-releasing reaction at the anaerobic stage because the concentration of organic substances supplied to the anaerobic stage is decreased more than the phosphoric acid ion concentration is decreased, such as in a case of the influx of rainwater, or when the quality of treated water is deteriorated by the decreased rate of the phosphorus-releasing reaction at the anaerobic stage because soluble pollutants in wastewater entering the anaerobic stage after being subjected to solid-liquid separation treatment in the primary settling tank have a low ratio of organic substance concentration to phosphoric acid ion concentration, the supply of the organic substances required for the phosphorus-releasing reaction is secured. Thus, a decrease in the rate of the phosphorus-releasing reaction at the anaerobic stage can be prevented, and the rate of the phosphorus-uptake reaction at the subsequent aerobic stage is effectively increased.

In embodiment 1, the ORP at the anaerobic stage is measured and only when the ORP is −100 mV or more, the primary settling tank sediment which has been subjected to crushing or grinding treatment is fed into the anaerobic stage. Thus, organic substances can be supplied only when the organic substance concentration in the wastewater is decreased and the organic substance concentration required for the phosphorus-releasing reaction is not secured. By such control, the cost of power required for crushing or grinding the primary settling tank sediment or the cost of power required to transport the primary settling tank sediment after crushing or grinding to the anaerobic stage can be minimized, and the organic substance load at the anaerobic stage and the aerobic stage can be minimized.

The primary settling tank sediment is subjected to crushing or grinding treatment so that the grain size of organic solids contained in the primary settling tank sediment is reduced and the organic solids are partially solubilized, and the crushed or ground sediment is then introduced to the anaerobic stage, and in some cases, further to the aerobic stage or to the denitrification stage. Thus, the crushed or ground sediment is promptly and effectively used in microbial reactions which mainly include phosphorus-releasing reactions and phosphorus-uptake reactions.

Since a general-purpose device can be used for crushing or grinding treatment, the cost of equipment can be minimized, the operating expenses, which mainly cover the cost of powering motors can be relatively low, and large solids can be effectively broken up.

EMBODIMENT 2

In embodiment 2, two problems are overcome. The first problem is that due to low organic substance concentration in wastewater, and in particular, a shortage of the soluble organic substance concentration, the phosphorus removal performance at a wastewater treatment plant using the anaerobic-aerobic activated sludge process is deteriorated. The second problem is that the residence time at reaction tanks in the plant using an activated sludge process represented by the conventional activated sludge process is not sufficient for the phosphorus removal performance in a plant using the anaerobic-aerobic activated sludge process. When the operating expenses such as for the addition of methanol are low and the existing activated sludge facilities for removing BOD are converted to wastewater treatment facilities using the anaerobic-aerobic activated sludge process, the BOD removal and the phosphorus removal can be performed by maximizing the utilization of volume and capacity of the existing facilities. Moreover, when a new plant is opened, it is possible to make the residence time at the entire reactor as compact as that in the plant using the conventional activated sludge process.

Embodiment 2 relates to an apparatus for removing phosphorus from wastewater including at least a settling tank in which wastewater to be treated is settled (a primary settling tank), an anaerobic tank, an aerobic tank, and a settling tank in which wastewater treated in these tanks is settled (a final settling tank). The apparatus is provided with a line for returning at least a portion of effluent from the aerobic tank or sludge withdrawn from the final settling tank to the primary settling tank, and a line for feeding at least a portion of the sludge from the primary settling tank to the anaerobic tank or the aerobic tank.

In the biological phosphorus removal apparatus in accordance with embodiment 2, by returning at least a portion of the mixed liquor flowing from the aerobic tank, at least a portion of the sludge withdrawn from the final settling tank, or both to the primary settling tank, organic substances contained in sediment and suspended solids in the primary settling tank, and microorganisms in the activated sludge returned to the primary settling tank are brought into contact with each other under the anaerobic conditions in the primary settling tank. By effectively utilizing the solid substances in the primary settling tank and the sludge retention time, phosphorus-releasing reactions proceed. By feeding at least a portion of the sludge withdrawn from the primary settling tank to the anaerobic stage, the anoxic stage, or the aerobic stage, the sludge settled in the primary settling tank, containing the activated sludge in which the phosphorus-releasing reactions have proceeded and solid organic substances, is fed to the anaerobic stage, the anoxic stage, or the aerobic stage. Thus, further phosphorus-releasing reactions at the anaerobic stage, phosphorus-uptake reactions, and in some cases, denitrification reactions, at the anoxic stage, or phosphorus-uptake reactions at the aerobic stage proceed.

That is, in the apparatuses of embodiment 2, since the mixed liquor containing activated sludge flowing from the aerobic tank or the sludge withdrawn from the final settling tank is returned to the primary settling tank, activated sludge is present in the primary settling tank. There are also solid organic substances as sediment and suspended solids and soluble organic substances originating from wastewater in the primary settling tank, and the activated sludge in the primary settling tank is brought into contact with these organic substances. Since the primary settling tank is not aerated and the wastewater normally has a large oxygen demand, the primary settling tank is anaerobic. That is, in the primary settling tank, activated sludge releases phosphoric acid ion accumulated in activated sludge cells into wastewater (the phosphorus-releasing reaction), using the organic substances. Subsequently, by feeding at least a portion of the sediment in the primary settling tank to the anaerobic tank or the aerobic tank, further phosphorus-releasing reactions in the anaerobic tank or phosphorus-uptake reactions in the aerobic tank are caused.

When the sludge withdrawn from the final settling tank is returned to the primary settling tank, since the sludge withdrawn from the final settling tank has a higher activated sludge concentration than that of the mixed liquor flowing from the aerobic tank, the required return volume is smaller with respect to the same amount of activated sludge, which is advantageous. When the mixed liquor flowing from the aerobic tank is returned to the primary settling tank, differing from the case when the sludge withdrawn from the final settling tank is returned to the primary settling tank, a water load to the final settling tank is not increased, which is also advantageous. When both the method for returning the sludge withdrawn from the final settling tank to the primary settling tank and the method for returning the mixed liquor flowing from the aerobic tank to the primary settling tank are combined, an intermediate merit between the two advantages described above can be obtained.

In the anaerobic tank, activated sludge releases phosphorus using organic substances mainly composed of soluble components in the wastewater, and in some cases, organic substances originating from the sediment in the primary settling tank. When at least a portion of the sediment in the primary settling tank is introduced to the anaerobic tank, differing from the conventional method, the activated sludge which has released phosphorus in the primary settling tank may be introduced to the anaerobic tank, together with organic solids originating from sediment in the primary settling tank, to perform a further phosphorus-releasing reaction, and thus the phosphorus-releasing reaction can be strengthened in comparison with the conventional method.

In the aerobic tank, activated sludge takes up phosphoric acid ion in the wastewater into activated sludge cells (the phosphorus-uptake reaction), using organic substances mainly composed of soluble components in the wastewater, and in some cases, organic substances originating from the sediment in the primary settling tank, and simultaneously, organic substances are oxidized, decomposed and removed. When at least a portion of the sediment in the primary settling tank is introduced to the aerobic tank, differing from the conventional method, since a phosphorus-uptake reaction is performed using even organic solids originating from the sediment in the primary settling tank, the phosphorus-uptake reaction can be strengthened in comparison with the conventional method. In such a case, in order to maintain the sufficient activated sludge concentration in the anaerobic tank, preferably, a portion of the sludge withdrawn from the final settling tank is returned to the anaerobic tank.

The method for removing phosphorus in accordance with the present invention is also applicable to a wastewater treatment apparatus including an anaerobic stage, a denitrification stage (an anoxic stage), and a nitrification stage (an aerobic stage), in addition to the wastewater treatment apparatus including the anaerobic stage and the aerobic stage.

Figure 7:
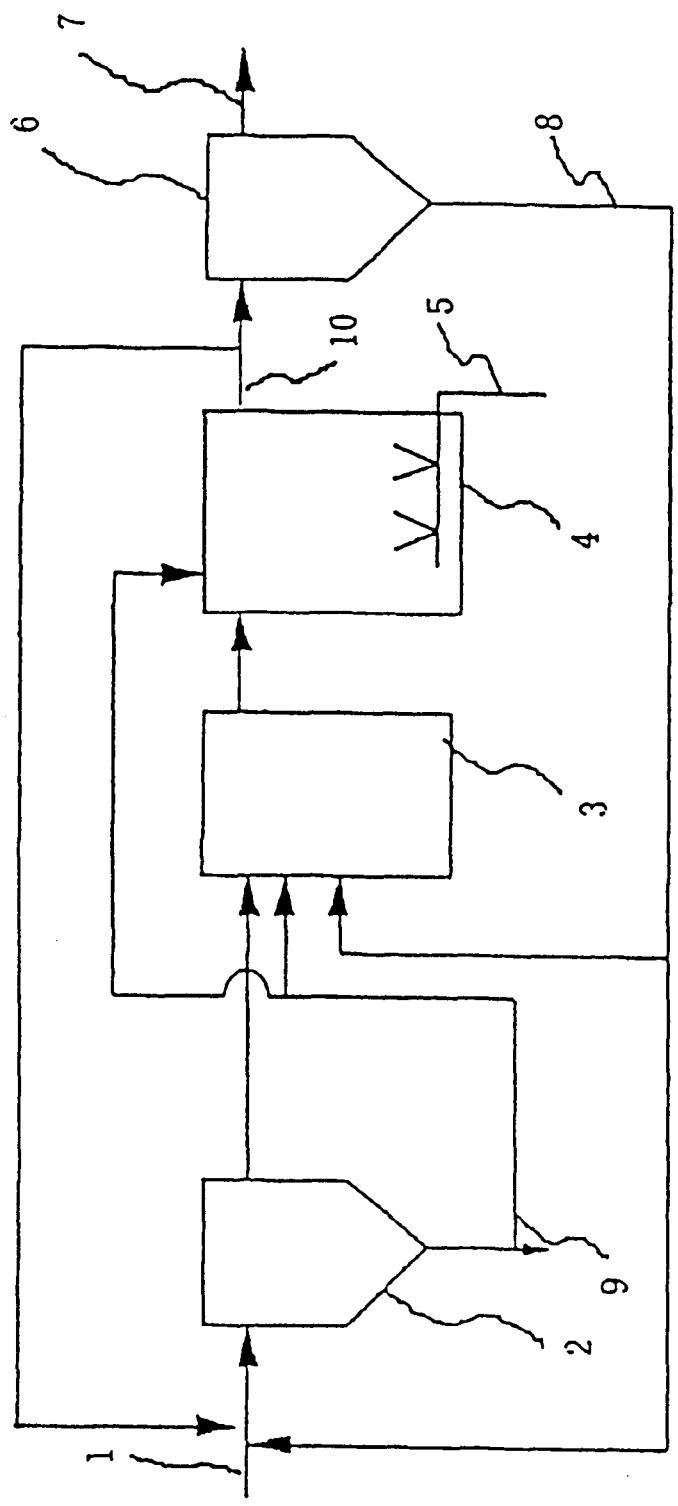
FIG. 7 is a block diagram of a biological phosphorus removal apparatus in accordance with embodiment 2.

An example of a biological phosphorus removal apparatus based on embodiment 2 is shown in FIG. 7.

The biological phosphorus removal apparatus based on embodiment 2 mainly includes a primary settling tank 2, an anaerobic tank 3, an aerobic tank 4, and a final settling tank 6. In the anaerobic tank 3, only agitation is performed, and in the aerobic tank 4, oxygen is supplied by an air diffuser 5 and agitation is performed by a flow caused by the air diffusion.

In the biological phosphorus removal apparatus based on embodiment 2 shown in FIG. 7, wastewater 1 is subjected to the solid-liquid separation in the primary settling tank 2, and is then passed to the anaerobic tank 3 and to the aerobic tank 4 in that order. Effluent 10 from the aerobic tank 4 flowing into the final settling tank 6 is separated into treated water 7 and activated sludge in the final settling tank 6, and preferably, at least a portion of the activated sludge separated and thickened in the final settling tank 6, that is, sludge 8 withdrawn from the final settling tank, is sent to the anaerobic tank 3 as return sludge.

At least a portion of the effluent 10 from the aerobic tank 4, at least a portion of the sludge 8 withdrawn from the final settling tank 6, or both is returned to the primary settling tank 2, and at least a portion of the sludge withdrawn from the primary settling tank 2, that is, sediment 9 in the primary settling tank, is fed to the anaerobic tank 3 or the aerobic tank 4.

Depending on the quality of wastewater and other conditions, at least a portion of the sediment 9 in the primary settling tank may be arranged to be sent to the anaerobic tank 3 instead of returning the sludge 8 withdrawn from the final settling tank 6 to the anaerobic tank 3.

Figure 8:
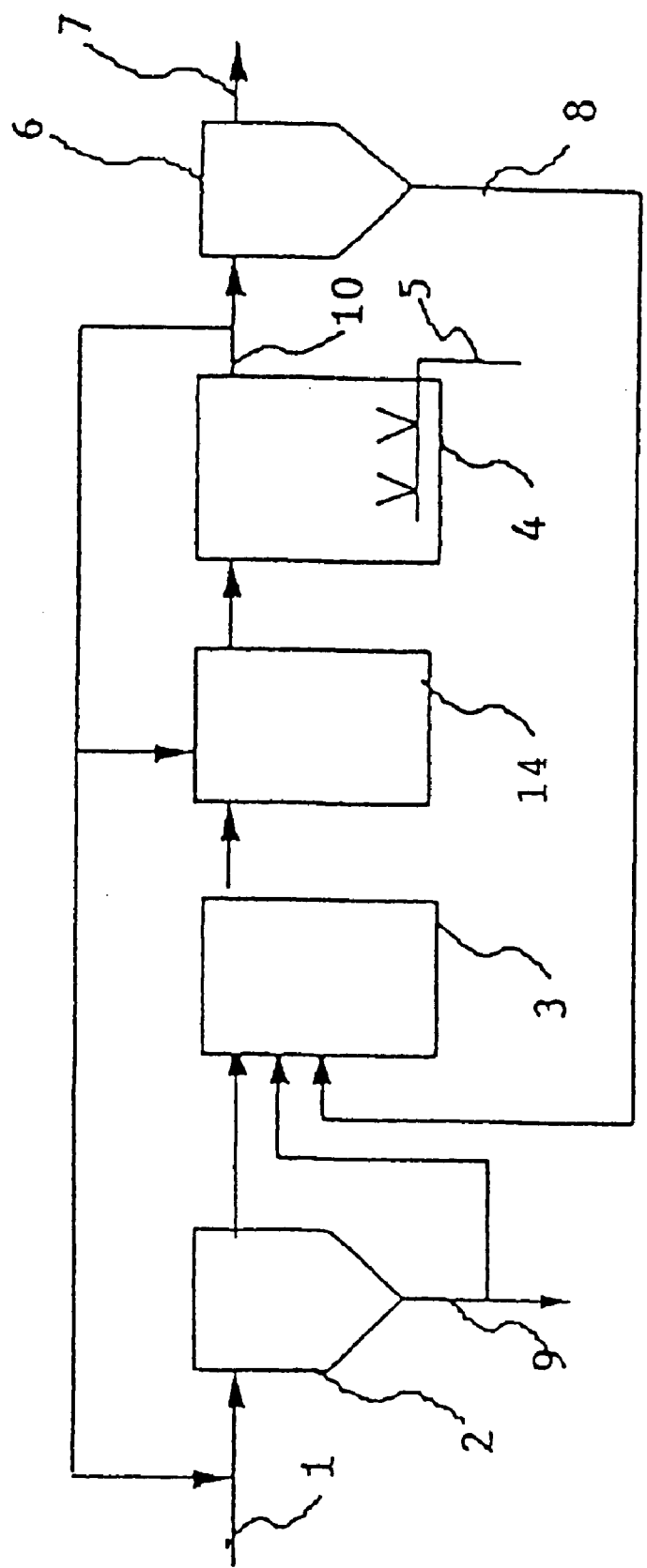
FIG. 8 is a block diagram of another biological phosphorus removal apparatus in accordance with embodiment 2.

FIG. 8 shows an example of a biological phosphorus removal apparatus in accordance with embodiment 2. In the biological phosphorus removal apparatus shown in FIG. 8, a denitrification tank 14 is added to the biological phosphorus removal apparatus shown in FIG. 7. The apparatus shown in FIG. 8 mainly includes a primary settling tank 2, anaerobic tank 3, the denitrification tank 14, an aerobic tank 4, and a final settling tank 6.

In the biological phosphorus removal apparatus based on embodiment 2 shown in FIG. 8, in the denitrification tank 14, only agitation is performed, and effluent from the anaerobic tank 3 and mixed liquor 10 from the aerobic tank 4 are fed into the denitrification tank 14. In the denitrification tank 14, nitrate nitrogen or nitrite nitrogen contained in the mixed liquor 10 from the aerobic tank 4 is reduced to nitrogen gas (the denitrification reaction), using organic substances in the wastewater, and thus denitrification treatment is performed.

Furthermore, in the biological phosphorus removal apparatus based on embodiment 2 shown in FIG. 8, the mixed liquor 10 from the aerobic tank 4 is returned to the primary settling tank 2 and at least a portion of the sediment 9 in the primary settling tank is fed to the anaerobic tank 3. By introducing activated sludge to the primary settling tank 2, a phosphorus-releasing reaction can be caused in the primary settling tank 2, and by feeding the sediment 9 containing the sludge in which the phosphorus-releasing reaction has proceeded to the anaerobic tank 3, a further phosphorus-releasing reaction proceeds in the anaerobic tank 3, and subsequently a phosphorus-uptake reaction proceeds in the denitrification tank 14 and the aerobic tank 4.

In FIG. 8, although the mixed liquor 10 flowing from the aerobic tank 4 is returned to the primary settling tank 2 in order to introduce activated sludge to the primary settling tank 2, a method of returning sludge 8 withdrawn from the final settling tank 6 to the primary settling tank 2 may be employed. Additionally, in FIG. 8, although the sediment 9 in the primary settling tank is fed to the anaerobic tank 3, the sediment 9 may be fed into the denitrification tank 14 or the aerobic tank 4. In order to accelerate the nitrification reaction, carriers for immobilizing microorganisms may be added to the aerobic tank 4.

Effluent from the aerobic tank has a sludge concentration of approximately 1,000 to 4,000 mg/L, and normally approximately 2,000 to 3,000 mg/L. The concentration of the sludge withdrawn from the final settling tank is approximately 5,000 to 10,000 mg/L, and normally approximately 6,500 to 8,500 mg/L. In the present invention, the sludge is preferably returned to the reactor at approximately 10 to 40% of the influent flow, and to the primary settling tank at approximately 5 to 30% of the influent flow. Meanwhile, in the steady state in which the sludge is being returned, the concentration of the sludge withdrawn from the primary settling tank is approximately 6,000 to 13,000 mg/L, and normally approximately 8,000 to 10,000 mg/L. In the present invention, the sludge is arranged to be sent to the anaerobic tank, the anoxic tank, or the aerobic tank at approximately 5 to 40% of the influent flow, and preferably, at approximately 10 to 30% of the influent flow. When the sludge is sent to two or more tanks, the amount described above corresponds to the total amount.

EXAMPLE OF THE INVENTION

An example of the biological phosphorus removal method in accordance with embodiment 2 will be described below. Comparative experiments were conducted with respect to an apparatus using the conventional anaerobic-aerobic activated sludge process as shown in FIG. 6 and an apparatus using the anaerobic-aerobic activated sludge process in accordance with the present invention as shown in FIG. 7 in which a portion of the sludge withdrawn from the final settling tank is returned to the primary settling tank and the sediment 9 in the primary settling tank is fed into the anaerobic tank 3. In either case, the volume of wastewater treated was 12 m³/day, and the residence time at the primary settling tank 2, the anaerobic tank 3, the aerobic tank 4, and the final settling tank 6 were set at 3 hours, 1 hour, 8 hours, and 4 hours, respectively. In the conventional method, the return sludge flow was set at 30% of the influent wastewater flow, and in the method of the present invention, sludge withdrawn from the final settling tank 6 was returned to the anaerobic tank 3 and the primary settling tank 2, at flows corresponding to 20% and 10% of the influent wastewater flow, respectively. The flow of the sediment 9 withdrawn from the primary settling tank and fed into the anaerobic tank 3 was set at 10% of the influent wastewater flow. As wastewater 1, domestic wastewater was used, and the experiments were conducted at water temperatures of 17 to 20° C. In each case, a three-month preliminary operation was carried out, and after treatment was stabilized, the quality of treated water was investigated. Table 2 shows the results of analysis with respect to the treated water in each case along with the domestic wastewater used. When the data was collected, the mixed liquor suspended solid (MLSS) concentration in the denitrification tank and the nitrification tank was approximately 2,600 mg/L in the conventional case, and approximately 2,700 mg/L in the method of embodiment 2.

TABLE 2

| | Samples | | |
|---|---|---|---|
| Analysis item | Domestic wastewater | Treated water in conventional method | Treated water in embodiment 2 |
| Total phosphorus (mg/L) | 3.8 | 1.5 | 0.4 |
| BOD (mg/L) | 85.2 | 11.6 | 10.7 |
| SS (mg/L) | 89.1 | 5.5 | 5.0 |
| PH (—) | 7.4 | 7.2 | 7.2 |
| Total nitrogen (mg/L) | 18.6 | 12.2 | 12.0 |

As is clear from Table 2, in accordance with the method of embodiment 2, treated water having a lower phosphorus concentration was obtained in comparison with the conventional method when the same amount of wastewater was treated using the facilities having the same capacity.

In accordance with the wastewater treatment of embodiment 2, the biological phosphorus removal apparatus includes the primary settling tank, the anaerobic stage, and in some cases, the anoxic stage, the aerobic stage, and the final settling tank. At least a portion of the mixed liquor flowing from the aerobic stage, at least a portion of the sludge withdrawn from the final settling tank, or both is returned to the primary settling tank, and at least a portion of sludge withdrawn from the primary settling tank is fed to the anaerobic stage, the anoxic stage, or the aerobic stage.

Accordingly, either when the quality of treated water is deteriorated by the decreased rate of the phosphorus-releasing reaction at the anaerobic stage because the concentration of organic substances supplied to the anaerobic stage is decreased more than the phosphorus concentration is decreased, such as a case of the influx of rainwater, or when the quality of treated water is deteriorated by the decreased rate of the phosphorus-releasing reaction at the anaerobic stage because soluble wastes in wastewater entering the anaerobic stage after being subjected to solid-liquid separation treatment in the primary settling tank have a low ratio of the organic substance concentration to the phosphorus concentration, the primary settling tank functions as a reaction tank for the phosphorus-releasing reaction, and even solid organic substances in the primary settling tank originating from wastewater can be effectively used for the phosphorus removal reaction. The sludge retention time in the primary settling tank also effectively works in order to advance the phosphorus-releasing reaction by activated sludge. Since solid organic substances in the primary settling tank originating from wastewater can be effectively used for the phosphorus-releasing reaction, or further for the phosphorus-uptake reaction, the cost for the chemical agent such as methanol to be added can be reduced. It is also not required to use chemicals such as ozone which incur electric power costs for production. The major operating expenses required for implementing the method of embodiment 2 are electric power costs for transporting liquid and air, which are substantially the same as those in the conventional facilities using the anaerobic-aerobic activated sludge process, resulting in low operating expenses.

In accordance with embodiment 2, since the primary settling tank functions as a reactor for the phosphorus-releasing reaction, and the sludge retention time in the primary settling tank effectively affects the phosphorus-releasing reaction, when the existing activated sludge facilities for removing BOD are converted to wastewater treatment facilities using the anaerobic-aerobic activated sludge process, the same effect can be obtained as that when reactors are enlarged without drastically changing the basic civil engineering structure of the existing facilities, and moreover, the designed water flow can be treated in the primary settling tank and the final settling tank. Thus, BOD removal treatment and phosphorus removal treatment, and in some cases, nitrogen removal treatment, can be performed by maximizing the utilization of volume and capacity of the existing facilities, and satisfactory treatment can be achieved, resulting in low construction costs (conversion costs). Moreover, when new wastewater treatment facilities using the anaerobic-aerobic activated sludge process is opened, since reactors for the biological treatment are as compact as those in the conventional facilities using the conventional activated sludge process, the construction costs are low.

EMBODIMENT 3

In embodiment 3, the deterioration of nitrogen removal performance of a wastewater treatment apparatus using the biological nitrification-denitrification process due to low organic substance concentration in wastewater, in particular, a shortage of the soluble organic substance concentration, is overcome. In accordance with embodiment 3, methods and apparatuses for effectively and economically removing nitrogen are provided, in which sludge containing solid organic substances generated in a primary settling tank is supplied to a denitrification tank or an anaerobic tank, and thus by compensating for the shortage of the organic substance concentration of the wastewater flowing into the denitrification tank or the anaerobic tank, organic substances generated in the waste treatment facilities are effectively used and the deterioration of nitrogen removal performance is avoided.

Embodiment 3 relates to methods for removing nitrogen from wastewater and apparatuses therefor, in which nitrogen in wastewater is removed using an apparatus including at least a settling tank for wastewater to be treated, a denitrification tank or an anaerobic tank, and a nitrification tank, and at least a portion of the sediment from the wastewater in the settling tank is crushed or ground before being supplied to the denitrification tank or the anaerobic tank.

In accordance with the method for biologically removing nitrogen from wastewater and the apparatus therefor in embodiment 3, at least a portion of sediment in the primary settling tank, which contains abundant solid organic substances, that is, at least a portion of the solid organic substances, is fed into the denitrification stage or the anaerobic stage in order to secure an organic substance concentration required for the denitrification reaction at the denitrification stage. By crushing or grinding at least a portion of the sediment in the primary settling tank, solid organic substances contained in the sediment in the primary settling tank are particulated or solubilized so that microorganisms can effectively and promptly use the solid organic substances for the denitrification reaction. The present inventors found through experimentation that when the organic substance concentration in wastewater is low and the organic substance concentration required for the denitrification reaction at the denitrification stage is insufficient, the oxidation-reduction potential (ORP) at the denitrification stage is 0 mV or more. Accordingly, the ORP at the denitrification stage is measured, and only when the ORP is 0 mV or more, that is, only when the organic substance concentration required for the denitrification reaction is insufficient at the denitrification stage, the sediment from the primary settling tank which has been crushed or ground is fed into the denitrification tank or the anaerobic tank. Thus, by supplying organic substances originating from the solids, the organic substance concentration required for the denitrification reaction will be sufficient.

Figure 9:
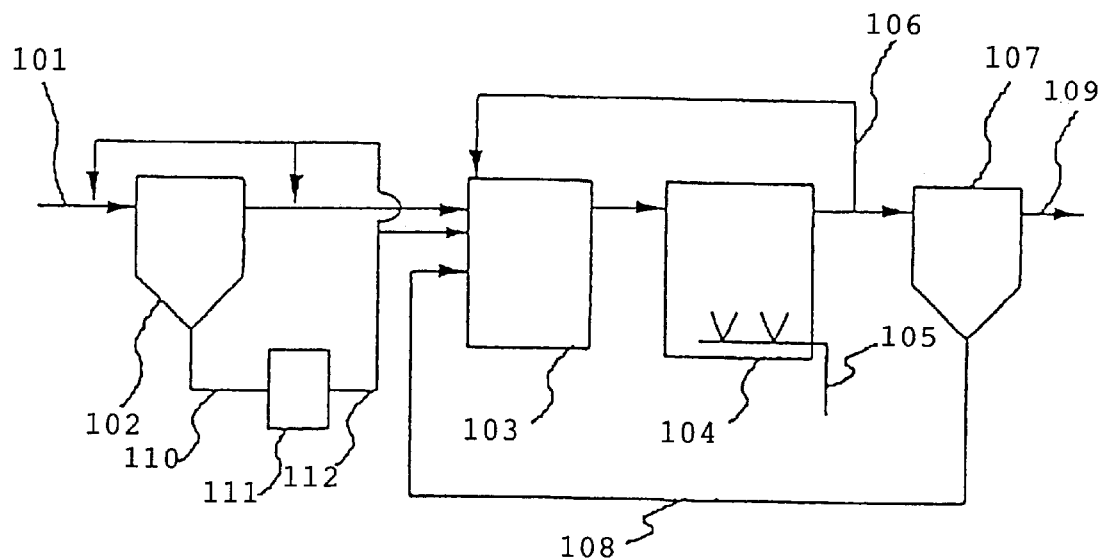
FIG. 9 is a block diagram of a biological nitrogen removal apparatus in accordance with embodiment 3.

An example of a biological nitrogen removal apparatus based on embodiment 3 is shown in FIG. 9.

The biological nitrogen removal apparatus based on embodiment 3 mainly includes a primary settling tank 102, a denitrification tank 103, a nitrification tank 104, and a final settling tank 107. In the denitrification tank 103, only agitation is performed, and in the nitrification tank 104, oxygen is supplied by an air diffuser 105 and agitation is performed by a flow caused by the air diffusion.

In the biological nitrogen removal apparatus shown in FIG. 9, wastewater 101 is subjected to the solid-liquid separation in the primary settling tank 102, and is then passed to the denitrification tank 103 and to the nitrification tank 104 in that order. Effluent from the nitrification tank 104 flowing into the final settling tank 107 is separated into treated water 109 and activated sludge in the final settling tank 107. At least a portion of the activated sludge separated and thickened in the final settling tank 107 is sent to the denitrification tank 103 as return sludge 108. A portion of effluent from the nitrification tank 104 is sent to the denitrification tank as a nitrification circulating liquid 106.

Sediment 110 settled in the primary settling tank is subjected to crushing or grinding treatment by a crushing device or a grinding device 111, and is then directly sent to the denitrification tank 103 as crushed or ground sediment 112 from the primary settling tank, or is sent to the denitrification tank 103 through the effluent channel of the primary settling tank 102. Alternatively, the crushed or ground sediment 112 is fed to the primary settling tank 102 through the influx channel of the primary settling tank 102, and a portion, excluding those which are settled again in the primary settling tank 102, is sent to the denitrification tank 103 through the effluent channel of the primary settling tank 102.

In the nitrification tank 104, nitrogen compounds in wastewater is oxidized to nitrate nitrogen or to nitrite nitrogen by activated sludge (the nitrification reaction), and simultaneously, organic substances are removed by oxidizing decomposition. In the denitrification tank 103, activated sludge reduces nitrate nitrogen or nitrite nitrogen contained in the wastewater 101, the return sludge 108, and the nitrification circulating liquid 106 to nitrogen gas (the denitrification reaction), using organic substances mainly composed of soluble components in the wastewater 101 and organic substances originating from the sediment 110.

After solid organic substances contained in the sediment 110 are treated by the crushing device or the grinding device 111, at least a portion thereof is finely particulated and at least a portion thereof becomes soluble components. That is, when the grain size of the solids are reduced by crushing or grinding treatment, the surface area increases with respect to solids having the same weight. Microorganisms, animals, plants, and the like are contained in the sediment 110, and these organisms are composed of cells enclosed by cell membranes and/or cell walls. When these membranous structures are broken by crushing or grinding treatment, since cell fluids are released from the cells, the soluble organic substance concentration of the wastewater into which the crushed or ground sediment 112 is fed is increased.

In general, when microorganisms propagate by decomposing and using organic substances, the organic substances having higher molecular weights take longer time to be decomposed and become useful. Organic substances having lower molecular weights are easier to be used, and the rate of the decomposing reaction is higher. In comparison with soluble organic substances, solid organic substances generally have higher molecular weights, and thus the solid organic substances are more difficult to be used by microorganisms. This is because of the fact that when microorganisms take up organic substances through cell membranes and/or cell walls, the organic substances must have enough low molecular weights. In order for microorganisms to use organic substances having high molecular weights, the organic substances having high molecular weights must be decomposed into organic substances having lower molecular weights, thus requiring time for decomposition to usable states. In organisms, reactions for decomposing organic substances having high molecular weights into organic substances having lower molecular weights are mainly performed by the enzymatic reactions. In such reactions, as the surface on which an enzyme acts is increased, that is, as the grain sizes of solid organic substances having comparable weights are decreased, the reaction rate increases. Consequently, in the method in accordance with embodiment 3, by subjecting the sediment 110 to crushing or grinding treatment so that the grain sizes of solids are reduced, the enzymatic reactions which allow microorganisms to decompose and use solid organic substances are enhanced, the rate of decomposition and use of solid organic substances is increased, and the microbial reactions may be effectively completed in a reactor of limited capacity. If the soluble organic substances generated by crushing or grinding the sediment 110 are introduced to the denitrification tank 103, they are also effectively and promptly used for the denitrification reaction by denitrifying bacteria. In this respect also, the crushing or grinding treatment to the sediment 110 contributes to an increase in the rate of decomposition and use of the organic substances contained in solids in the influent wastewater 101 by microorganisms in the reaction tank, and this is effective to complete the microbial reactions in a reactor of limited capacity.

The crushed or ground sediment 112 may be directly fed into the denitrification tank 103, or may be fed into the effluent channel of the primary settling tank 102 at any point from the weir to the denitrification tank 103. When such a method is used, all the crushed or ground sediment 112 can be fed into the denitrification tank 103. Since the capacity of the channel from the supply point of the crushed or ground sediment 112 to the denitrification tank 103 is relatively small and the residence time is relatively short, by changing the feed amount of the crushed or ground sediment 112, the reaction in the denitrification tank 103 may be controlled over relatively short periods of time. Whether the crushed or ground sediment 112 is directly fed into the denitrification tank 103 or is fed into the effluent channel of the primary settling tank 102 at any point from the weir to the denitrification tank 103 can be determined depending on the distance between the installation position of the crushing device or grinding device 111 and the supplying position of the crushed or ground sediment 112, waterhead difference, or the like.

The crushed or ground sediment 112 may be fed into the influx channel of the primary settling tank 102 at any point, and after removing the solids settled again in the primary settling tank 102, components of the crushed or ground sediment 112 which are not settled may be fed into the denitrification tank 103 together with the overflow from the primary settling tank 102. In such a method, although all of the crushed or ground sediment 112 is not fed into the denitrification tank 103, since the capacity of the channel from the supply point of the crushed or ground sediment 112 to the denitrification tank 103 is large and the residence time is increased, the components, excluding solids which readily settle out, originating from the crushed or ground sediment 112 can be fed into the denitrification tank 103 at relatively stable concentrations.

The withdrawal of the sediment 110 from the primary settling tank 102 is performed by opening an outlet provided on the lower section or the bottom of the primary settling tank 102. The sediment 110 may be naturally discharged in accordance with the position of the primary settling tank 102 or a pump may be used.

The sediment treated by the crushing device or grinding device is in the form of a suspension or a slurry, and has a concentration of approximately 3,000 to 12,000 mg/l, and normally approximately 5,000 to 10,000 mg/l.

The timing of adding the crushed or ground sediment is determined, for example, by measuring the oxidation-reduction potential (ORP) of the denitrification tank, and when the ORP is 0 mV or more, the addition is performed. When the ratio of the organic substance concentration to the nitrogen concentration in the soluble waste in wastewater 101 is always rather low, it is therefore practical to continuously add the crushed or ground sediment during operation.

The pump used for withdrawing the sediment 109 from the primary settling tank is generally a slurry pump which does not easily clog, and thus the pump is not very effective for crushing or grinding the sediment. Therefore, in order to crush or grind the sediment, a crushing device or a grinding device must be provided. The crushing device or the grinding device 111 may be of various types, such as a gear type and a multiple spindle disk type. In order to control the degree of crushing or grinding, it is effective to appropriately select the mesh of a screen in which the crushed or ground sediment is to be passed. If the screen mesh is too small, clogging easily occurs, and if it is too large, solids having a large grain size easily pass therethrough, and thus the screen mesh size is preferably chosen to be approximately 1 to 5 mm. Although the crushing device or the grinding device 111 may be installed in-line or in an open channel, since the sediment 110 may be a source of unpleasant odors, the in-line installation is preferred. Since a general-purpose device can be used as such a crushing device or grinding device 111, the cost of equipment as well as the operating expenses, which mainly cover the cost of powering motors, will become relatively low, and the grain size reduction effect with respect to solids will be relatively large.

The load of the crushed or ground sediment is, preferably, approximately 0.1 to 1.5% on the volume of the wastewater 101, and normally approximately 0.5 to 1.0%. The addition may be continuously or intermittently performed.

The addition is preferably terminated when the ORP reaches approximately −50 to −150 mV, and depending on the result, continuous addition may be effective.

Figure 10:
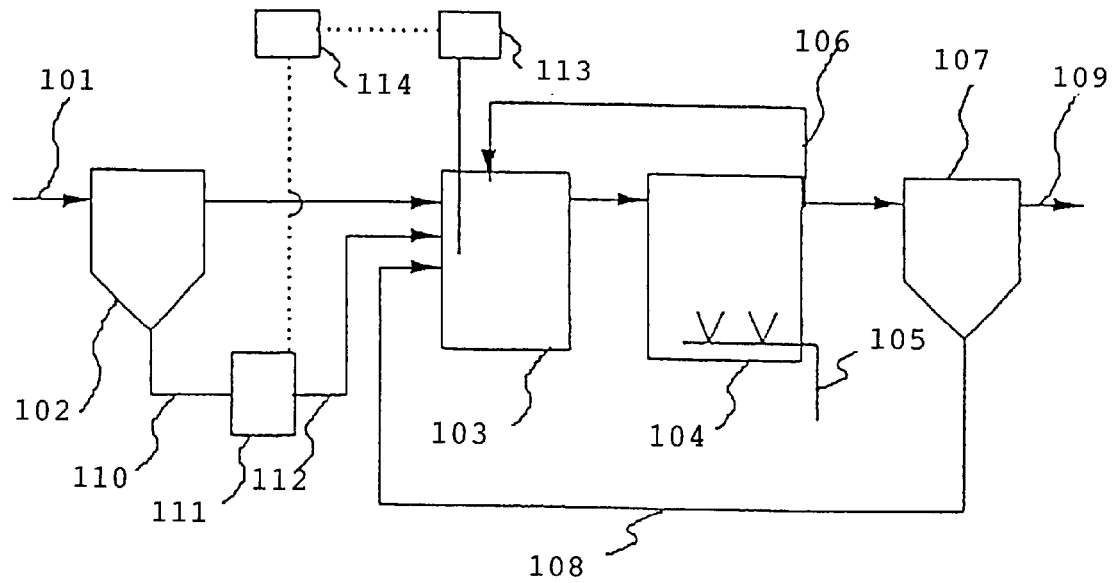
FIG. 10 is a block diagram of another biological nitrogen removal apparatus in accordance with embodiment 3.

FIG. 10 shows another example of a biological nitrogen removal apparatus in accordance with embodiment 3. With respect to the biological nitrogen removal apparatus based on the conventional technique shown in FIG. 14, in accordance with the results of the inventors' knowledge from experimentation, when the soluble organic substance concentration in the wastewater 101 is high and the organic substance concentration required for the denitrification reaction in the denitrification tank 103 is obtained, the ORP in the denitrification tank 103 is 0 mV or less, and when the organic substance concentration in the wastewater 101 is low and the organic substance concentration required for the denitrification reaction in the denitrification tank 103 is not satisfactory, the ORP in the denitrification tank 103 is 0 mV or more. Based on the above, in the biological nitrogen removal apparatus in accordance with embodiment 3 shown in FIG. 10, the operation of the apparatus is controlled so that when the measured value by an ORP meter 113 mounted on a denitrification tank 103 is 0 mV or less, the influx of crushed or ground sediment 112 from a primary settling tank is halted or the operation of a crushing device or a grinding device 111 is halted, and when the measured value is 0 mV or more, the introduction of the crushed or ground sediment 112 is started. These controls are performed by a control device 114.

The nitrogen removal method in accordance with embodiment 3 is also applicable to a wastewater treatment apparatus including an anaerobic stage, a denitrification stage (an anoxic stage), and a nitrification stage (an aerobic stage), in addition to the wastewater treatment apparatus including the denitrification stage and the nitrification stage.

Figure 11:
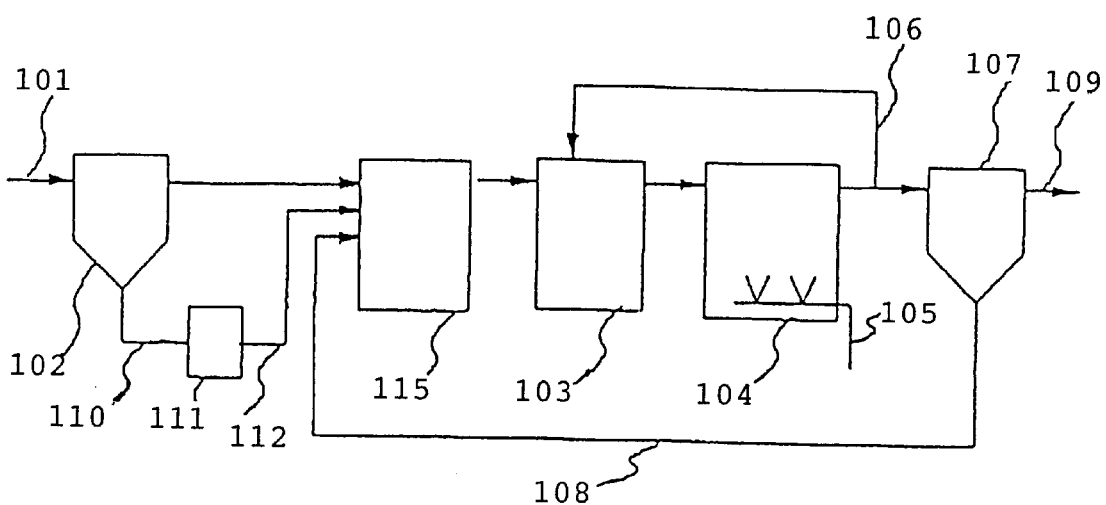
FIG. 11 is a block diagram of another biological nitrogen removal apparatus in accordance with embodiment 3.

FIG. 11 shows another example of a biological nitrogen removal apparatus in accordance with embodiment 3. In the biological nitrogen removal apparatus in accordance with embodiment 3 shown in FIG. 11, an anaerobic tank 115 is added to the biological nitrogen removal apparatus in accordance with embodiment 3 shown in FIG. 9. The apparatus shown in FIG. 11 mainly includes a primary settling tank 102, the anaerobic tank 115, a denitrification tank 103, a nitrification tank 104, and a final settling tank 107.

In the biological nitrogen removal apparatus shown in FIG. 11, in the anaerobic tank 115, only agitation is performed, and wastewater 101 and return sludge 108 are fed into the anaerobic tank 115. In the anaerobic tank 115, activated sludge reduces nitrate nitrogen or nitrite nitrogen contained in wastewater 101 and return sludge 108 to nitrogen gas (the denitrification reaction), using organic substances mainly composed of soluble components in the wastewater 101, and activated sludge releases phosphate anions accumulated in cells (the biological phosphorus-releasing reaction). In the denitrification tank 103, agitation is also performed and nitrate nitrogen or nitrite nitrogen contained in nitrification circulating liquid and mixed liquor flowing from the anaerobic tank 115 is reduced to nitrogen gas (the denitrification reaction). Furthermore, in the denitrification tank 103 and the nitrification tank 104, activated sludge takes up phosphate anions in wastewater into cells (the biological phosphorus-uptake reaction). In the nitrification tank 104, organic nitrogen and ammonia nitrogen are oxidized to nitrate nitrogen or nitrite nitrogen (the nitrification reaction). Organic substances are consumed and treated in each of the anaerobic tank 115, the denitrification tank 103, and the nitrification tank 104.

Additionally, in the biological nitrogen removal apparatus shown in FIG. 11 in accordance with embodiment 3, crushed or ground sediment 112 from the primary settling tank is arranged to be fed into the anaerobic tank 115. A portion of the crushed or ground sediment 112 or the entire crushed or ground sediment 112 may be fed into the denitrification tank 103.

EXAMPLE OF THE INVENTION

An example of the biological nitrogen removal method in accordance with embodiment 3 will be described below.

Figure 12:
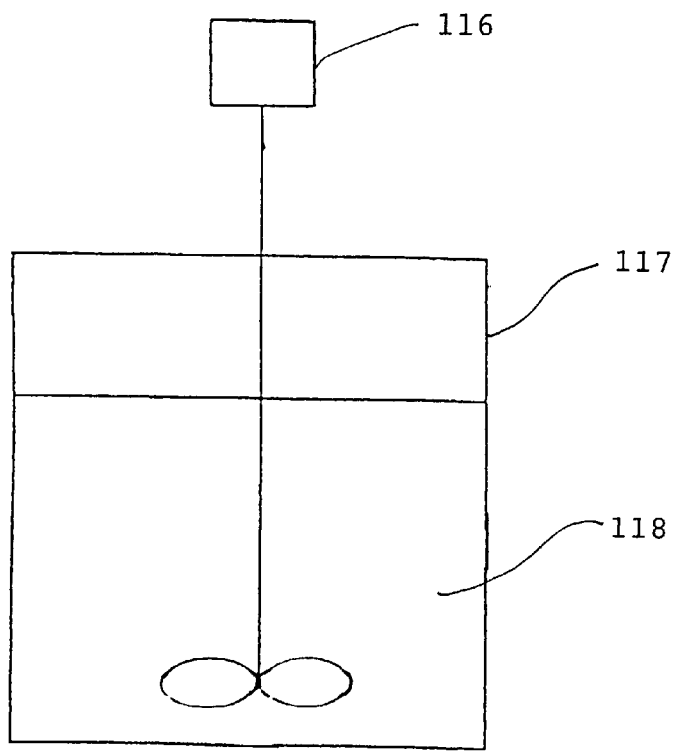
FIG. 12 is a side view of an experimental device for the denitrification reaction in accordance with embodiment 3.
Figure 14:
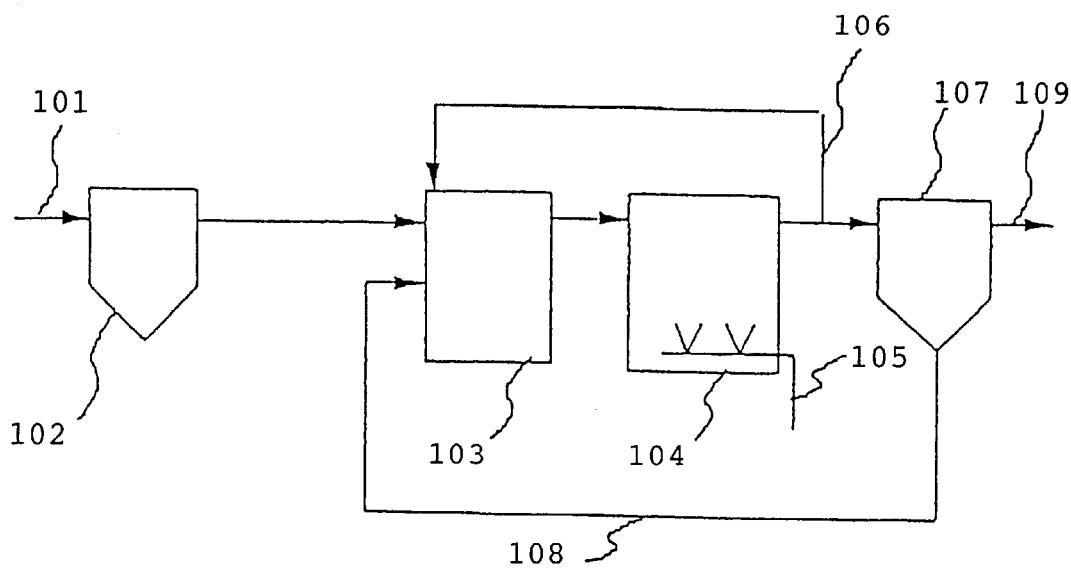
FIG. 14 is a block diagram of a conventional biological nitrogen removal apparatus.

FIG. 12 shows an experimental device. In the example, a mixture of return sludge, nitrification circulating liquid, wastewater, and primary settling tank sediment taken from a wastewater treatment apparatus having a flow pattern as shown in FIG. 14 as a sample was fed into the device shown in FIG. 12, and characteristics of the denitrification reaction of activated sludge under denitrification tank conditions were measured. Table 3 shows the composition of samples. The wastewater taken from the wastewater treatment apparatus having a flow shown in FIG. 14 had a BOD concentration of 44 mg/L, and the return sludge and the nitrification circulating liquid had MLSS concentrations of 4,300 mg/L and 1,800 mg/L, respectively. In order to determine if the wastewater treatment apparatus having a flow shown in FIG. 9 functioned effectively, the primary settling tank sediment having an MLSS concentration of 3,400 mg/L taken from the primary settling tank in the wastewater treatment apparatus having a flow shown in FIG. 14 was ground for 3 minutes by a Potter-type glass homogenizer having a capacity of 10 ml, and its effectiveness as an organic substance source was investigated.

TABLE 3

| Sample and Volume | Sample A | Sample B |
| --- | --- | --- |
| Nitrification circulating liquid (ml) | 1,500 | 1,500 |
| Return sludge (ml) | 500 | 500 |
| Wastewater (ml) | 1,000 | 1,000 |
| Ground sediment from primary settling tank (ml) | 20 | 0 |

Figure 13:
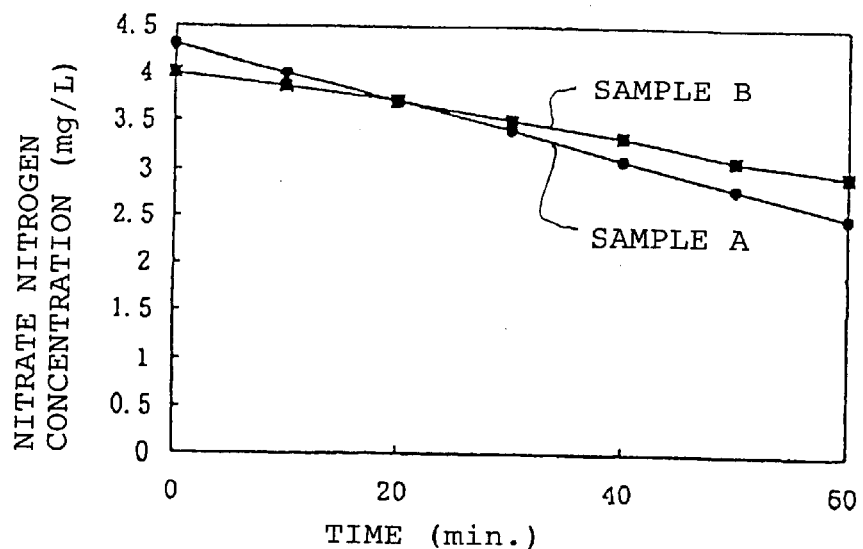
FIG. 13 is a graph showing a change in the nitrate nitrogen concentration over time in cases when ground sediment from the primary settling tank is added and when it is not added, using the device shown in FIG. 12.

FIG. 13 shows a change in the nitrate nitrogen concentration in the sample wastewater over time. A sample A in which the denitrification reaction was performed with the ground primary settling tank sediment being added was compared with a sample B in which the denitrification reaction was performed without the ground primary settling tank sediment. The rate of decrease of nitrate nitrogen in the wastewater was higher when the denitrification reaction was performed with the ground sediment being added. That is, it has been confirmed that by adding the primary settling tank sediment, which had been subjected to grinding treatment in order to reduce the grain size of solids and to solubilize a portion of organic substances, to the sample wastewater, the rate of the denitrification reaction was increased.

Since crushing treatment is similar to grinding treatment, the crushing treatment is also considered to be effective in reducing the grain size of solids in the primary settling tank sediment and in solubilizing a portion of the organic substances.

In embodiment 3, the primary settling tank sediment which has been crushed or ground is fed into a denitrification stage, and in some cases, to a denitrification stage or an anaerobic stage of a biological nitrogen removal apparatus having the anaerobic stage and the nitrification stage, so that the organic substance concentration required for the denitrification reaction at the denitrification stage is secured.

Accordingly, either when the quality of treated water is deteriorated by the decreased rate of denitrification reaction at the denitrification stage because the concentration of organic substances supplied to the denitrification stage is decreased more than the nitrogen concentration is decreased, such as in a case of the influx of rainwater, or when the quality of treated water is deteriorated by the decreased rate of the denitrification reaction at the denitrification stage because soluble wastes in wastewater entering the denitrification stage after being subjected to solid-liquid separation treatment in the primary settling tank have a low ratio of organic substance concentration to nitrogen concentration, the supply of the organic substances required for the denitrification reaction is secured. Thus, a decrease in the rate of the denitrification reaction at the denitrification stage can be avoided.

In embodiment 3, the ORP at the denitrification stage is measured and only when the ORP is 0 mV or more, the primary settling tank sediment which has been subjected to crushing or grinding treatment is fed into the denitrification stage or the anaerobic stage. Thus, organic substances can be supplied only when the organic substance concentration in the wastewater is decreased and the organic substance concentration required for the denitrification reaction is insufficient. By such control, the cost of power required for crushing or grinding the primary settling tank sediment or the cost of power required to transport the primary settling tank sediment after crushing or grinding to the denitrification stage or the anaerobic stage can be minimized, and the organic substance load at the denitrification stage, the anaerobic stage, and the nitrification stage can be minimized.

The primary settling tank sediment is subjected to crushing or grinding treatment so that the grain size of organic solids contained in the primary settling tank sediment is reduced and the organic solids are partially solubilized, and the crushed or ground sediment is then introduced to the denitrification tank or the denitrification stage such as the anaerobic tank. Thus, the crushed or ground sediment is promptly and effectively used in microbial reactions which mainly include nitrogen reactions.

Since a general-purpose device can be used for crushing or grinding treatment, the cost of equipment can be minimized, the operating expenses, which mainly cover the cost of powering motors can be relatively low, and large solids can be effectively broken up.

EMBODIMENT 4

Embodiment 4 overcomes the following problems. The first problem is that due to a shortage of the organic substance concentration in wastewater, and in particular, a shortage of the soluble organic substance concentration, the nitrogen removal performance at a wastewater treatment facilities using the biological nitrification-denitrification process is deteriorated. The second problem is that due to a shortage of the residence time at reaction tanks when facilities using an activated sludge process represented by the conventional activated sludge process is converted to facilities using the biological nitrification-denitrification process, the nitrogen removal performance at the wastewater treatment facilities using the biological nitrification-denitrification process is deteriorated. When the operating expenses such as for the addition of methanol are low and the existing activated sludge facilities for removing BOD are converted to wastewater treatment facilities using the biological nitrification-denitrification process, the BOD removal and the nitrogen removal can be performed by maximizing the utilization of volume and capacity of the existing facilities. When a new plant is opened, it is possible to make the residence time at the entire reactors as compact as that in the plant using the conventional activated sludge process.

Embodiment 4 relates to an apparatus for removing nitrogen from wastewater including at least a settling tank in which wastewater to be treated is settled (a primary settling tank), a denitrification tank, a nitrification tank, and a settling tank in which wastewater treated in these tanks is settled (a final settling tank). The apparatus is provided with a line for returning at least a portion of the effluent from the nitrification tank or the effluent from the final settling tank to the primary settling tank.

In the biological nitrogen removal apparatus in accordance with embodiment 4, at least a portion of the mixed liquor flowing from the nitrification tank, a portion of the treated water from the final settling tank, or both is returned to the primary settling tank. Thus, denitrifying bacteria contained in solids existing as sediment and suspended matter, and solid organic substances in the primary settling tank are effectively used for the denitrification reaction, and the primary settling tank is also used as a reaction tank for the denitrification reaction. When at least a portion of the mixed liquor from the nitrification stage is returned to the primary settling tank, if the returned volume is large and all the sludge withdrawn from the primary settling tank is introduced to the sludge treatment stage, the mixed liquor suspended solid concentration may be decreased and the rate of the denitrification reaction or the nitrification reaction, or both may be decreased, resulting in a hindrance to treatment. Therefore, by feeding at least a portion of sludge in the primary settling tank to the denitrification tank or the anaerobic tank, the sufficient concentration of mixed liquor suspended solids in the reaction tank is obtained.

That is, in general, the mixed liquor from the nitrification tank contains nitrate nitrogen or nitrite nitrogen due to the treatment at the nitrification tank, and since the treated water flowing from the final settling tank corresponds to the mixed liquor from the nitrification tank from which solids are removed, the treated water contains nitrate nitrogen or nitrite nitrogen. Moreover, even if the nitrification reaction takes place sufficiently, when the denitrification reaction is insufficient because of a shortage of the organic substances used in the denitrification reaction, a shortage of the residence time in the denitrification reaction tank, or the like, the total of the nitrate nitrogen concentration and the nitrite nitrogen concentration will be increased in the mixed liquor from the nitrification tank and the treated water.

One of the reasons for the insufficient denitrification reaction is that since the ratio of the organic substance concentration to the nitrogen concentration in soluble pollutants in wastewater is low, most of the solid organic substances contained in the wastewater are removed in the primary settling tank, and thus with respect to the composition of the wastewater entering the denitrification tank, the amount of organic substances is low in comparison with that of nitrate nitrogen or nitrite nitrogen. Therefore, in such a case, by returning at least a portion of the mixed liquor from the nitrification tank, at least a portion of the treated water flowing from the final settling tank, or both, solid organic substances originating from wastewater which exist as sediment and suspended matter in the primary settling tank can be effectively used as a reducing agent for the denitrification reaction. Since the wastewater in the primary settling tank has a relatively high organic substance concentration and a large oxygen demand, the primary settling tank is anaerobic, which satisfies the requirement for the denitrification reaction. Moreover, the denitrification reaction depends on the nitrate respiration activity and the nitrite respiration activity by microorganisms. Characteristics such as nitrate respiration or nitrite respiration are widely observed in soil microorganisms and activated sludge microorganisms. Since some of microorganisms constituting solids in the primary settling tank have the denitrification activity, even when the treated water as mixed liquor from the nitrification tank from which solids are removed is introduced to the primary settling tank, microorganisms which cause the denitrification are supplied in the primary settling tank.

Another reason for the insufficient denitrification reaction is that the residence time at the denitrification is insufficient. The factors affecting the rate of the denitrification reaction includes water temperature, sludge concentration, the quality and amount of substrates including organic substances. Microorganisms which cause the denitrification reaction themselves may be used as substrates (an endogenous denitrification reaction). When the denitrification reaction is insufficient, it is effective in expediting the denitrification reaction to increase time (residence time) for the coexistence of nitrate nitrogen or nitrite nitrogen and microorganisms under the anaerobic conditions. In accordance with the present invention, since the primary settling tank can be used as a denitrification reaction tank, the residence time at the primary settling tank, which is generally designed for 3 to 6 hours, effectively contributes to the satisfactory denitrification.

In embodiment 4, at least a portion of the mixed liquor from the nitrification tank, at least a portion of the treated water flowing from the final settling tank, or both is returned to the primary settling tank. When at least a portion of the mixed liquor from the nitrification tank is returned to the primary settling tank, since denitrifying bacteria in the mixed liquor suspended solids, together with nitrate nitrogen or nitrite nitrogen, are supplied to the primary settling tank, an increase in rate of the denitrification reaction in the primary settling tank may be achieved. In order to increase the percentage of the portion to be supplied to the denitrification treatment in nitrate nitrogen or nitrite nitrogen contained in the mixed liquor from the nitrification tank, the flow amount of the mixed liquor from the nitrification tank or the treated water to be returned to the primary settling tank must be relatively large in comparison with the flow amount of the wastewater. However, when the amount of the mixed liquor from the nitrification tank returned to the primary settling tank is large and all of the sludge withdrawn from the primary settling tank is introduced to the sludge treatment stage, the thinning rate of activated sludge is higher than the propagation rate of activated sludge. The activated sludge concentration in the denitrification tank and the nitrification tank is decreased and the rate of the denitrification in the denitrification tank and the rate of the nitrification in the nitrification tank are decreased, thus adversely affecting the treatment. When at least a portion of the treated water is returned to the primary settling tank, since the concentration of denitrifying bacteria in the primary settling tank is relatively low, the rate of the reaction is relatively low. In such a case, even if all the sludge withdrawn from the primary settling tank is introduced to the sludge treatment stage, the thinning effect of activated sludge, which may occur when the mixed liquor from the nitrification tank is returned to the primary settling tank, is not caused. When both a portion of the mixed liquor from the nitrification tank and a portion of the treated water from the final settling tank are returned to the primary settling tank, the rate of the denitrification in the primary settling tank and the activated sludge concentration in the denitrification tank and the nitrification tank are affected at an intermediate level between the two cases described above.

Figure 15:
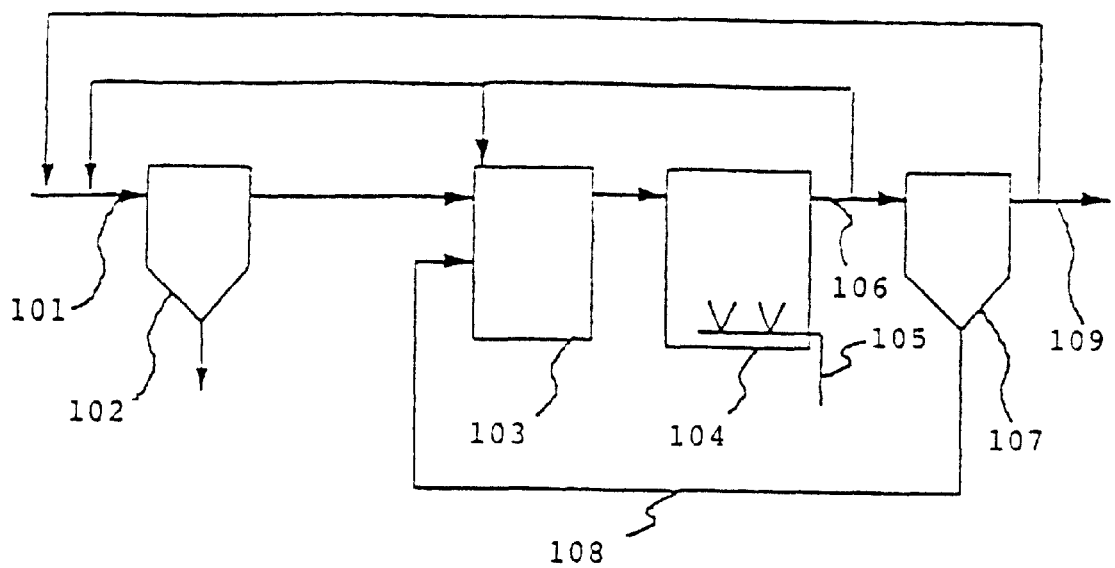
FIG. 15 is a block diagram of a biological nitrogen removal apparatus in accordance with embodiment 4.

An example of a biological nitrogen removal apparatus based on embodiment 4 is shown in FIG. 15. Embodiment 4 will be described in detail with reference to the drawing.

The biological nitrogen removal apparatus based on embodiment 4 mainly includes a primary settling tank 102, a denitrification tank 103, a nitrification tank 104, and a final settling tank 107. In the denitrification tank 103, only agitation is performed, and in the nitrification tank 104, oxygen is supplied by an air diffuser 105 and agitation is performed by a flow caused by the air diffusion.

In the biological nitrogen removal apparatus based on embodiment 4 shown in FIG. 15, wastewater 101 is subjected to the solid-liquid separation in the primary settling tank 102, and is then passed to the denitrification tank 103 and to the nitrification tank 104 in that order. Effluent from the nitrification tank 104 flowing into the final settling tank 107 is separated into treated water 109 and activated sludge in the final settling tank 107, and preferably, at least a portion of the activated sludge separated and thickened in the final settling tank 107 is sent to the denitrification tank 103 as return sludge 108. At least a portion of the effluent mixed with sludge from the nitrification tank 104, at least a portion of the treated water 109 flowing from the final settling tank 107, or both is returned to the primary settling tank 102.

In the nitrification tank 104, by the action of activated sludge, and in some cases, by the action of immobilized activated sludge on carriers for immobilizing microorganisms fed into the nitrification tank 104, nitrogen compounds in the wastewater are oxidized to nitrate nitrogen or nitrite nitrogen (the nitrification reaction), and organic substances are removed by oxidizing decomposition. In the denitrification tank 103, activated sludge reduces nitrate nitrogen or nitrite nitrogen, contained in the wastewater 101, the return sludge 108, and the mixed liquor from the nitrification tank 106, to nitrogen gas (the denitrification reaction), using organic substances mainly composed of soluble components in the wastewater 101.

Figure 16:
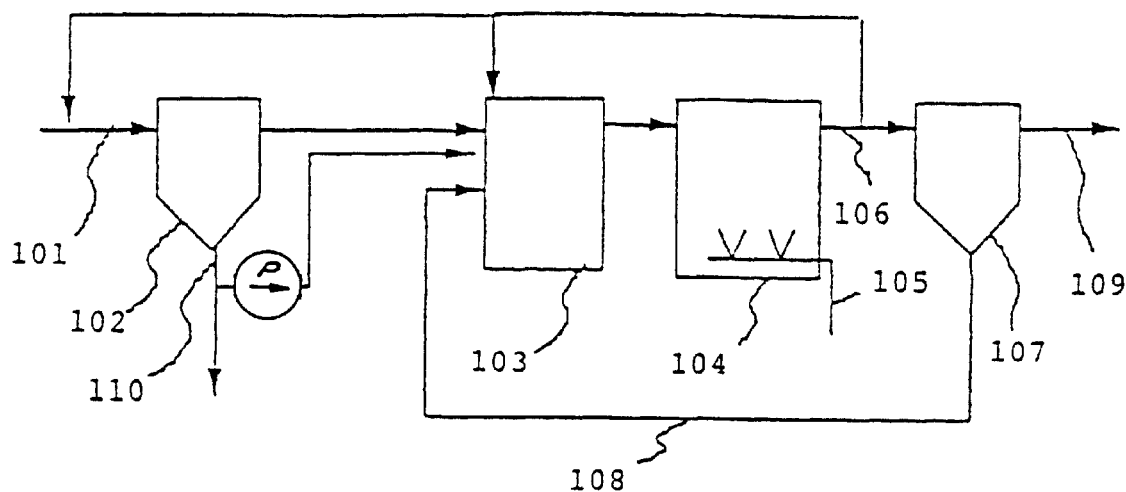
FIG. 16 is a block diagram of another biological nitrogen removal apparatus in accordance with embodiment 4.

FIG. 16 shows another example of a biological nitrogen removal apparatus in accordance with embodiment 4. In this apparatus, a portion of the mixed liquor from the nitrification tank is returned to a primary settling tank 102, and simultaneously at least a portion of primary settling tank sediment 110 is introduced to a denitrification tank 103. As described above, when the amount of the mixed liquor 106 from the nitrification tank returned to the primary settling tank 102 is large and all of the sediment 110 withdrawn from the primary settling tank is introduced to the sludge treatment stage, the activated sludge concentration in the denitrification tank 103 and the nitrification tank 104 is decreased, and the rate of the denitrification in the denitrification tank 103 and the rate of nitrification in the nitrification tank 104 are decreased, and thus hindrance to treatment may occur. However, in this apparatus, by introducing at least a portion of the primary settling tank sediment 110 to the denitrification tank 103, the sufficient MLSS concentration in the reaction tank can be obtained.

In addition to the wastewater treatment apparatus including the denitrification stage and the nitrification stage, the nitrogen removal method in accordance with the present invention will be applicable to a wastewater treatment apparatus including the anaerobic stage, the denitrification stage (anoxic stage), and the nitrification stage (aerobic stage), and a portion of the primary settling tank sediment 110 may be introduced to the anaerobic tank in addition to the denitrification tank.

Figure 17:
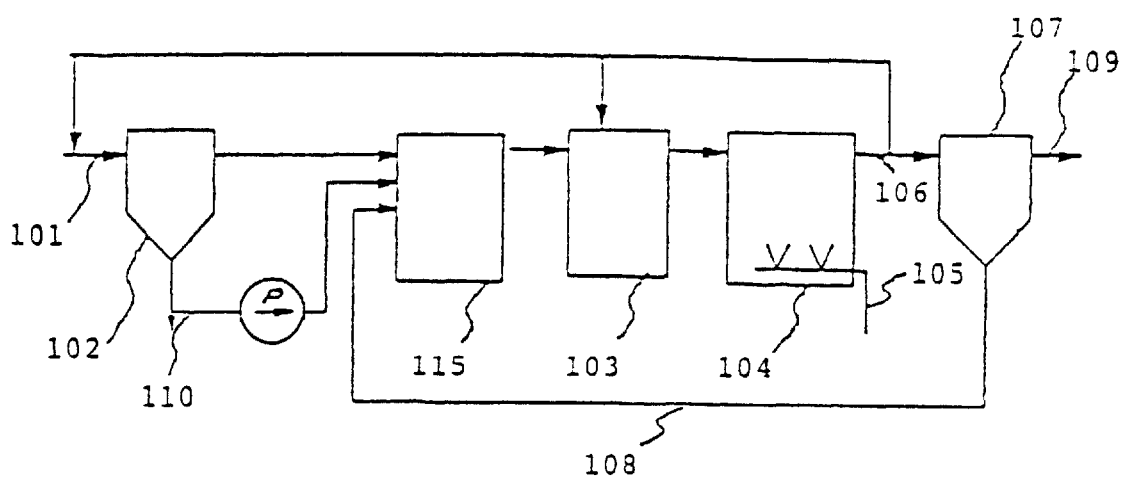
FIG. 17 is a block diagram of another biological nitrogen removal apparatus in accordance with embodiment 4.

FIG. 17 shows another example of a biological nitrogen removal apparatus in accordance with embodiment 4. In the biological nitrogen removal apparatus in accordance with embodiment 4 shown in FIG. 17, an anaerobic tank 115 is added to the biological nitrogen removal apparatus in accordance with embodiment 4 shown in FIG. 15. The apparatus shown in FIG. 17 mainly includes a primary settling tank 102, the anaerobic tank 115, a denitrification tank 103, a nitrification tank 104, and a final settling tank 107.

In the biological nitrogen removal apparatus shown in FIG. 17, in the anaerobic tank 115, only agitation is performed, and wastewater 101, return sludge 108, and at least a portion of primary settling tank sediment 110 are fed into the anaerobic tank 115. In the anaerobic tank 115, activated sludge reduces nitrate nitrogen or nitrite nitrogen contained in the wastewater 101 and the return sludge 108 to nitrogen gas (the denitrification reaction), using inflow organic substances, and activated sludge releases phosphate anions accumulated in cells into the wastewater (the biological phosphorus-releasing reaction). In the denitrification tank 103, agitation is also performed and nitrate nitrogen or nitrite nitrogen contained in nitrification circulating liquid and mixed liquor flowing from the anaerobic tank 115 is reduced to nitrogen gas (the denitrification reaction). Furthermore, in the denitrification tank 103 and the nitrification tank 104, activated sludge takes up phosphate anions in the wastewater into cells (the biological phosphorus-uptake reaction). In the nitrification tank 104, organic nitrogen and ammonia nitrogen are oxidized to nitrate nitrogen or nitrite nitrogen (the nitrification reaction). Organic substances are consumed and treated in each of the anaerobic tank 115, the denitrification tank 103, and the nitrification tank 104. In this embodiment, solid organic substances originating from the wastewater 101 in the primary settling tank 102 are also effectively used as a reducing agent for the denitrification reaction, and denitrifying bacteria contained in the solid organic substances principally cause the denitrification reaction. The primary settling tank 2 also functions as a denitrification tank.

Additionally, in the biological nitrogen removal apparatus shown in FIG. 17 in accordance with embodiment 4, although a portion of or all of the primary settling tank sediment 110 is designed to be fed into the anaerobic tank 115, a portion of or all of the primary settling tank sediment 110 may be fed into the denitrification tank 103.

In the case of sewage treatment, with respect to effluent from the nitrification tank, the total concentration of nitrate nitrogen and nitrite nitrogen is approximately 10 to 250 mg/L, and normally approximately 15 to 30 mg/L. With respect to effluent from the final settling tank, the total concentration of nitrate nitrogen and nitrite nitrogen is approximately 1 to 15 mg/L, and normally approximately 5 to 10 mg/L. The effluent from the nitrification tank to be returned to the primary settling tank is preferably set at approximately 10 to 300%, and normally approximately 20 to 100%. The effluent from the final settling tank to be returned to the primary settling tank is preferably set at approximately 20 to 100%. Although the return amount may be changed depending on the nitrate nitrogen concentration or the nitrite nitrogen concentration of the effluent, a given amount facilitates the operational administration. However, when the nitrate nitrogen concentration or the nitrite nitrogen concentration in the effluent from the final settling tank exceeds the controlled amount, all the volume is returned to the primary settling tank or the denitrification tank.

EXAMPLE OF THE INVENTION

An example of the biological nitrogen removal method in accordance with embodiment 4 will be described below.

Comparative experiments were conducted with respect to a conventional biological nitrogen removal apparatus as shown in FIG. 14 and a biological nitrogen removal apparatus in accordance with the present invention as shown in FIG. 15 in which a portion of treated water 109 is returned to the primary settling tank. In either case, the volume of wastewater treated was 12 m$^3$/day, and the residence time at the primary settling tank, the denitrification tank, the nitrification tank, and the final settling tank were set at 3 hours, 4 hours, 2 hours, and 4 hours, respectively. In either case, in order to accelerate nitrification, hollow cylindrical carriers composed of expandable polypropylene having an inside diameter of 3 mm, an outside diameter of 4 mm, and a length of 5 mm were fed into the nitrification tank at an apparent volume ratio of 16%, that is, at a true volume ratio of 4%. As wastewater 101, domestic wastewater was used, and the experiments were conducted at water temperatures of 17 to 20° C. In the conventional method, the total of the returned sludge flow amount and the nitrification circulating liquid flow amount is set at 200% of the original wastewater flow, and in the method of the present invention, the total of the returned sludge flow amount, the nitrification circulating liquid flow amount, and the flow amount of the treated water to the primary settling tank was set at 200% of the original wastewater flow. In each case, a three-month preliminary operation was carried out, and after treatment was stabilized, the quality of treated water was investigated. Table 4 shows the results of analysis with respect to the treated water in each case along with the domestic wastewater used. When the data was collected, the mixed liquor suspended solid (MLSS) concentration at the denitrification tank and the nitrification tank was approximately 1,600 mg/L in either case.

TABLE 4

| | Samples | | |
| --- | --- | --- | --- |
| Analysis item | Domestic wastewater | Treated water in conventional method | Treated water in embodiment 4 |
| Total nitrogen (mg/L) | 20.6 | 6.5 | 2.4 |
| Nitrate + Nitrite nitrogen (mg/L) | 0.2 | 5.8 | 1.7 |
| Ammonia nitrogen (mg/L) | 19.1 | 0 | 0 |
| BOD (mg/L) | 74.5 | 12.2 | 12.0 |
| SS (mg/L) | 55.0 | 8.2 | 8.1 |

As is clear from Table 4, in accordance with the method of embodiment 4, treated water having a lower nitrogen concentration was obtained in comparison with the conventional method when the same amount of wastewater was treated using the facilities having the same capacity.

In accordance with embodiment 4, the biological nitrogen removal apparatus includes the denitrification stage, in some cases, the anaerobic stage, and the nitrification stage, as well as the primary settling tank and the final settling tank. At least a portion of the mixed liquor flowing from the nitrification stage, at least a portion of the treated water flowing from the final settling tank, or both is returned to the primary settling tank. When at least a portion of the mixed liquor flowing from the nitrification stage is returned to the primary settling tank, at least a portion of the sludge settled in the primary settling tank is fed into the denitrification tank or the anaerobic tank.

Accordingly, either when the quality of treated water is deteriorated by the decreased rate of the denitrification reaction at the denitrification stage because the concentration of organic substances supplied to the denitrification stage is decreased more than the nitrogen concentration is decreased, such as a case of the influx of rainwater, or when the quality of treated water is deteriorated by the decreased rate of the denitrification reaction at the denitrification stage because soluble wastes in wastewater entering the denitrification stage after being subjected to solid-liquid separation treatment in the primary settling tank have a low ratio of organic substance concentration to nitrogen concentration, organic substances contained in solids and denitrifying bacteria originating from wastewater in the primary settling tank effectively contribute to the denitrification reaction. The retention time in the primary settling tank also effectively works in order to advance the denitrification reaction. Since solid organic substances in the primary settling tank originating from the wastewater can be used as a reducing agent for the denitrification reaction, the cost for the organic substance such as methanol to be added can be reduced. It is also not required to use chemicals such as ozone which incur electric power costs for production. The major operating expenses required for implementing the method of this invention are electric power costs for transporting liquid and air, which are substantially the same as those in the conventional wastewater treatment facilities using the biological nitrification-denitrification process, resulting in reduced operating expenses.

In accordance with embodiment 4, since the primary settling tank also functions as a denitrification reaction tank, and the retention time in the primary settling tank effectively affects the denitrification reaction, when the existing activated sludge facilities for removing BOD are converted to wastewater treatment facilities using the biological nitrification-denitrification process, the same effect can be obtained as that when existing reaction tanks are enlarged, and moreover, the originally designed water flow can be treated in the primary settling tank and the final settling tank. Thus, BOD removal treatment and nitrogen removal treatment can be performed by maximizing the utilization of volume and capacity of the existing activated sludge process facilities, and satisfactory treatment can be achieved. In accordance with the present invention, when the existing activated sludge facilities for removing BOD are converted to wastewater treatment facilities using the biological nitrification-denitrification process, the BOD removal and the nitrogen removal can be performed without drastically changing the basic engineering structure of the existing facilities, and without drastically reducing the volume of the treated water, resulting in low construction costs (conversion costs). Moreover, when new wastewater treatment facilities using the biological nitrification-denitrification process are opened, since biological treatment tanks are as compact as those in the conventional facilities using the standard activated sludge process, the construction costs are low.

When at least a portion of the mixed liquor from the nitrification tank is returned to the primary settling tank, since denitrifying bacteria in suspended solids in addition to nitrate nitrogen or nitrite nitrogen are fed to the primary settling tank, the rate of the denitrification reaction in the primary settling tank may be increased. On the other hand, when the volume of the mixed liquor flowing from the nitrification tank returned to the primary settling tank is large, and all the sludge withdrawn from the primary settling tank is introduced to the sludge treatment stage, the mixed liquor suspended solid concentration in the denitrification tank 103 and the nitrification tank 104 may be decreased, and thus the rate of the denitrification reaction in the denitrification tank 103 and the rate of the nitrification reaction may be decreased, resulting in a hindrance to the treatment. In such a case, in accordance with the present invention, at least a portion of the primary settling tank sludge is fed into the denitrification tank or the anaerobic tank, thus preventing a decrease in the mixed liquor suspended solid concentration in the denitrification tank or the anaerobic tank. Consequently, while the amount of nitrate nitrogen or nitrite nitrogen supplied to the denitrification reaction is increased by increasing the flow amount of the mixed liquor flowing from the nitrification tank in order to improve the nitrogen removal rate, the stable operation of the apparatus is enabled.

What is claimed is:

1. A wastewater treatment apparatus comprising:
   a primary settling means for removing solids contained in wastewater to produce a first treated effluent and a sediment;
   a denitrification means, into which the first treated effluent from the primary settling means is introduced, for reducing nitrate nitrogen or nitrite nitrogen in the first treated effluent to nitrogen gas to produce a second treated effluent;
   a nitrification means, into which the second treated effluent from the denitrification means is introduced, for oxidizing nitrogen compounds in the second treated effluent to nitrate nitrogen or nitrite nitrogen to produce a third treated effluent;
   a final settling means, into which the third treated effluent is introduced, for settling the third treated effluent from the nitrification means to produce a final treated effluent and an activated sludge; and
   a returning means comprising a third treated effluent returning means for returning a portion of the third treated effluent to the primary settling means.

2. A wastewater treatment apparatus according to claim 1, further comprising an anaerobic means arranged between the primary settling means and the denitrification means, wherein the first treated effluent from the primary settling means is introduced, nitrate nitrogen or nitrite nitrogen in the first treated effluent is reduced to nitrogen gas, and the activated sludge releases phosphate anions from cells into the first treated effluent by a biological phosphorus-releasing reaction.

3. A wastewater treatment apparatus according to claim 2, further comprising a sending means for sending the sediment produced in the primary settling means to the anaerobic means.

4. A wastewater treatment apparatus according to claim 1, further comprising a sending means for sending the sediment produced in the primary settling means to the denitrification means.

5. A wastewater treatment apparatus according to claim 1, further comprising a means for returning the activated sludge produced in the final settling means to the denitrification means.

6. A wastewater treatment apparatus comprising:
   a primary settling means for removing solids contained in wastewater to produce a first treated effluent and a sediment;
   a denitrification means, into which the first treated effluent from the primary settling means is introduced, for reducing nitrate nitrogen or nitrite nitrogen in the first treated effluent to nitrogen gas to produce a second treated effluent;

a nitrification means, into which the second treated effluent from the denitrification means is introduced, for oxidizing nitrogen compounds in the second treated effluent to nitrate nitrogen or nitrite nitrogen to produce a third treated effluent;

a final settling means, into which the third treated effluent is introduced, for settling the third treated effluent from the nitrification means to produce a final treated effluent and an activated sludge; and a returning means comprising a final treated effluent returning means for returning a portion of the final treated effluent to the primary settling means.

7. A wastewater treatment apparatus according to claim 6, further comprising an anaerobic means arranged between the primary settling means and the denitrification means, wherein the first treated effluent from the primary settling means is introduced, nitrate nitrogen or nitrite nitrogen in the first treated effluent is reduced to nitrogen gas, and the activated sludge releases phosphate anions from cells into the first treated effluent by a biological phosphorus-releasing reaction.

8. A wastewater treatment apparatus according to claim 7, further comprising a sending means for sending the sediment produced in the primary settling means to the anaerobic means.

9. A wastewater treatment apparatus according to claim 6, further comprising a sending means for sending the sediment produced in the primary settling means to the denitrification means.

10. A wastewater treatment apparatus according to claim 6, further comprising a means for returning the activated sludge produced in the final settling means to the denitrification means.

11. A wastewater treatment apparatus comprising:

a primary settling means for removing solids contained in wastewater to produce a first treated effluent and a sediment;

a denitrification means, into which the first treated effluent from the primary settling means is introduced, for reducing nitrate nitrogen or nitrite nitrogen in the first treated effluent to nitrogen gas to produce a second treated effluent;

a nitrification means, into which the second treated effluent from the denitrification means is introduced, for oxidizing nitrogen compounds in the second treated effluent to nitrate nitrogen or nitrite nitrogen to produce a third treated effluent;

a final settling means, into which the third treated effluent is introduced, for settling the third treated effluent from the nitrification means to produce a final treated effluent and an activated sludge; and a returning means comprising a third treated effluent returning means for returning a portion of the third treated effluent to the primary settling means and a final treated effluent returning means for returning a portion of the final treated effluent to the primary settling means.

12. A wastewater treatment apparatus according to claim 11, further comprising an anaerobic means arranged between the primary settling means and the denitrification means, wherein the first treated effluent from the primary settling means is introduced, nitrate nitrogen or nitrite nitrogen in the first treated effluent is reduced to nitrogen gas, and the activated sludge releases phosphate anions from cells into the first treated effluent by a biological phosphorus-releasing reaction.

13. A wastewater treatment apparatus according to claim 12, further comprising a sending means for sending the sediment produced in the primary settling means to the anaerobic means.

14. A wastewater treatment apparatus according to claim 11, further comprising a sending means for sending the sediment produced in the primary settling means to the denitrification means.

15. A wastewater treatment apparatus according to claim 11, further comprising a means for returning the activated sludge produced in the final settling means to the denitrification means.

* * * * *